US011831383B2

(12) United States Patent
Raghavan et al.

(10) Patent No.: US 11,831,383 B2
(45) Date of Patent: Nov. 28, 2023

(54) BEAM FAILURE RECOVERY ASSISTANCE IN UPPER BAND MILLIMETER WAVE WIRELESS COMMUNICATIONS

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 17/156,789

(22) Filed: Jan. 25, 2021

(65) Prior Publication Data
US 2021/0234602 A1    Jul. 29, 2021

Related U.S. Application Data

(60) Provisional application No. 62/966,511, filed on Jan. 27, 2020.

(51) Int. Cl.
*H04B 7/06* (2006.01)
*H04W 24/08* (2009.01)
(Continued)

(52) U.S. Cl.
CPC ......... *H04B 7/0695* (2013.01); *H04B 7/0617* (2013.01); *H04B 17/309* (2015.01);
(Continued)

(58) Field of Classification Search
CPC ... H04B 7/0695; H04B 7/0617; H04W 76/19; H04W 24/08
See application file for complete search history.

(56) References Cited

U.S. PATENT DOCUMENTS 6,002,360 A   12/1999   Wolcott et al.
7,826,415 B2  11/2010   Oh et al.
(Continued)

FOREIGN PATENT DOCUMENTS

CN    113287349 B    11/2022
EP      3167653 A1    5/2017
(Continued)

OTHER PUBLICATIONS

Ericsson: "FFSs Regarding Early Measurement Configurations", 3GPP Draft, 3GPP TSG-RAN WG2#106, R2-1907254—FFSS Regarding Early Measurement Configurations, 3rd Generation Partnership Project (3GPP), Mobile Competence Centre, 650, Route Des Lucioles, F-06921 Sophia-Antipolis Cedex, vol. RAN WG2, No. Reno, Nevada, USA, May 13, 2019-May 17, 2019 May 13, 2019 (May 13, 2019), XP051730695, pp. 1-4, Retrieved from the Internet: URL:http://www.3gpp.org/ftp/Meetings%5F3GPP%5FSYNC/RAN2/Docs/R2%2D1907254%2Ezip [retrieved on May 13, 2019] p. 3, paragraph 2.3 p. 4, paragraph 2.4.
(Continued)

*Primary Examiner* — Jutai Kao
(74) *Attorney, Agent, or Firm* — Holland & Hart LLP

(57) ABSTRACT

Methods, systems, and devices for wireless communications are described in which a first wireless device and second wireless device may establish communications using a first beam and a second beam. The first wireless device may perform separate radio link monitoring (RLM) procedures to monitor beam quality for each of a transmit beam and receive beam that are used for communications with a second wireless device. The separate RLM procedures may be used at the first wireless device to determine that one of the transmit or receive beams is experiencing a quality degradation or a radio link failure (RLF), and an RLF indication may be provided to the second wireless device.

48 Claims, 17 Drawing Sheets

(51) Int. Cl.
*H04W 76/19* (2018.01)
*H04B 17/309* (2015.01)
*H04W 24/02* (2009.01)

(52) U.S. Cl.
CPC ........... *H04W 24/02* (2013.01); *H04W 24/08* (2013.01); *H04W 76/19* (2018.02)

(56) References Cited

U.S. PATENT DOCUMENTS

| | | |
|---|---|---|
| 8,503,322 B2 | 8/2013 | Krishnamurthy et al. |
| 9,312,933 B2 | 4/2016 | Zhang et al. |
| 9,363,683 B2 | 6/2016 | Raghavan et al. |
| 9,520,973 B2 | 12/2016 | Kim et al. |
| 9,806,777 B1 | 10/2017 | Doostnejad et al. |
| 10,075,223 B1 | 9/2018 | Pawar et al. |
| 10,425,901 B2 | 9/2019 | Islam et al. |
| 10,462,796 B2 | 10/2019 | Frenne et al. |
| 10,574,321 B2 | 2/2020 | Nilsson et al. |
| 10,826,585 B2 | 11/2020 | Bolotin et al. |
| 10,841,914 B2 | 11/2020 | Liou et al. |
| 10,924,173 B2 | 2/2021 | Bai et al. |
| 11,438,877 B2 | 9/2022 | Luo et al. |
| 2006/0008275 A1 | 1/2006 | Lacovara et al. |
| 2006/0039318 A1 | 2/2006 | Oh et al. |
| 2011/0069633 A1 | 3/2011 | Schmidt et al. |
| 2011/0255434 A1 | 10/2011 | Ylitalo |
| 2012/0064841 A1 | 3/2012 | Husted et al. |
| 2012/0140658 A1 | 6/2012 | Kanzaki et al. |
| 2014/0235287 A1 | 8/2014 | Maltsev et al. |
| 2014/0241446 A1 | 8/2014 | Zhang et al. |
| 2014/0363166 A1 | 12/2014 | Lacovara |
| 2015/0092621 A1 | 4/2015 | Jalloul et al. |
| 2015/0349863 A1 | 12/2015 | El Ayach et al. |
| 2016/0020876 A1 | 1/2016 | Raghavan et al. |
| 2016/0044517 A1 | 2/2016 | Raghavan et al. |
| 2016/0112173 A1 | 4/2016 | Wang et al. |
| 2017/0005958 A1 | 1/2017 | Frenkel et al. |
| 2017/0013630 A1 | 1/2017 | Franz et al. |
| 2017/0117947 A1 | 4/2017 | Petersson et al. |
| 2017/0195998 A1 | 7/2017 | Zhang et al. |
| 2017/0294926 A1 | 10/2017 | Islam et al. |
| 2017/0359826 A1 | 12/2017 | Islam et al. |
| 2017/0364819 A1 | 12/2017 | Yang |
| 2018/0062720 A1 | 3/2018 | Islam et al. |
| 2018/0063693 A1 | 3/2018 | Chakraborty et al. |
| 2018/0138962 A1* | 5/2018 | Islam ............... H04B 7/0695 |
| 2018/0227094 A1 | 8/2018 | Liu et al. |
| 2018/0227772 A1 | 8/2018 | Yu et al. |
| 2018/0249453 A1 | 8/2018 | Nagaraja et al. |
| 2018/0249526 A1 | 8/2018 | Nagaraja et al. |
| 2018/0278309 A1 | 9/2018 | Raghavan et al. |
| 2018/0278320 A1 | 9/2018 | Chendamarai et al. |
| 2019/0044596 A1 | 2/2019 | Bolotin et al. |
| 2019/0053220 A1 | 2/2019 | Zhang et al. |
| 2019/0081753 A1 | 3/2019 | Jung et al. |
| 2019/0103908 A1 | 4/2019 | Yu et al. |
| 2019/0150161 A1 | 5/2019 | Cheng et al. |
| 2019/0174385 A1* | 6/2019 | Sang ............... H04W 76/19 |
| 2019/0190582 A1* | 6/2019 | Guo ............... H04L 27/2607 |
| 2019/0349863 A1 | 11/2019 | Lim et al. |
| 2019/0393948 A1 | 12/2019 | Zhao et al. |
| 2020/0015106 A1 | 1/2020 | Lane et al. |
| 2020/0028545 A1* | 1/2020 | Koskela ............... H04B 7/0408 |
| 2020/0029274 A1 | 1/2020 | Cheng et al. |
| 2020/0059280 A1 | 2/2020 | Thurfjell et al. |
| 2020/0068644 A1 | 2/2020 | Zhou et al. |
| 2020/0091978 A1 | 3/2020 | Noh et al. |
| 2020/0136708 A1 | 4/2020 | Pan et al. |
| 2020/0145079 A1 | 5/2020 | Marinier et al. |
| 2020/0145929 A1 | 5/2020 | Ryu et al. |
| 2020/0178134 A1* | 6/2020 | Yang ............... H04W 36/00837 |
| 2020/0178261 A1 | 6/2020 | Ioffe et al. |
| 2020/0220631 A1 | 7/2020 | Onggosanusi et al. |
| 2020/0228190 A1 | 7/2020 | Cirik et al. |
| 2020/0259618 A1 | 8/2020 | Yang et al. |
| 2020/0259703 A1 | 8/2020 | Cirik et al. |
| 2020/0260300 A1 | 8/2020 | Cirik et al. |
| 2020/0314906 A1 | 10/2020 | Goyal et al. |
| 2020/0351798 A1 | 11/2020 | Ji et al. |
| 2020/0366348 A1 | 11/2020 | Bolotin et al. |
| 2020/0374806 A1 | 11/2020 | Manolakos et al. |
| 2020/0374960 A1 | 11/2020 | Deenoo et al. |
| 2020/0383060 A1 | 12/2020 | Park et al. |
| 2021/0021325 A1 | 1/2021 | Davydov et al. |
| 2021/0022094 A1 | 1/2021 | Luo et al. |
| 2021/0036741 A1 | 2/2021 | Park et al. |
| 2021/0050898 A1 | 2/2021 | Yu et al. |
| 2021/0068077 A1 | 3/2021 | Raghavan et al. |
| 2021/0084672 A1 | 3/2021 | Gulati et al. |
| 2021/0099958 A1 | 4/2021 | Bae et al. |
| 2021/0105780 A1 | 4/2021 | Jin et al. |
| 2021/0105860 A1 | 4/2021 | Tsai et al. |
| 2021/0111779 A1 | 4/2021 | Kundargi et al. |
| 2021/0119688 A1 | 4/2021 | Enescu et al. |
| 2021/0127379 A1 | 4/2021 | Harrebek et al. |
| 2021/0136598 A1 | 5/2021 | Raghavan et al. |
| 2021/0144716 A1 | 5/2021 | Choi et al. |
| 2021/0153085 A1 | 5/2021 | Rahman et al. |
| 2021/0153209 A1 | 5/2021 | Guan et al. |
| 2021/0159946 A1 | 5/2021 | Raghavan et al. |
| 2021/0159966 A1 | 5/2021 | Xi et al. |
| 2021/0160850 A1 | 5/2021 | Akkarakaran et al. |
| 2021/0160881 A1 | 5/2021 | Rahman et al. |
| 2021/0226681 A1 | 7/2021 | Raghavan et al. |
| 2021/0234586 A1 | 7/2021 | Raghavan et al. |
| 2021/0234593 A1 | 7/2021 | Raghavan et al. |
| 2021/0234597 A1 | 7/2021 | Raghavan et al. |
| 2021/0234598 A1 | 7/2021 | Raghavan et al. |
| 2021/0234604 A1 | 7/2021 | Raghavan et al. |
| 2021/0235434 A1 | 7/2021 | Raghavan et al. |
| 2021/0250940 A1 | 8/2021 | Raghavan et al. |
| 2021/0251040 A1 | 8/2021 | Tang et al. |
| 2021/0265741 A1 | 8/2021 | Kenington |
| 2021/0329621 A1 | 10/2021 | Raghavan |
| 2021/0359826 A1 | 11/2021 | Wang et al. |
| 2021/0410094 A1* | 12/2021 | Cui ............... H04W 56/0055 |
| 2022/0006539 A1 | 1/2022 | Sun et al. |
| 2022/0070823 A1 | 3/2022 | Ma et al. |
| 2022/0086702 A1 | 3/2022 | Wang et al. |
| 2022/0149924 A1 | 5/2022 | Zhang et al. |
| 2022/0150717 A1 | 5/2022 | Geng et al. |
| 2022/0200146 A1 | 6/2022 | Du et al. |
| 2022/0201505 A1* | 6/2022 | Zhao ............... H04L 5/0048 |
| 2022/0210810 A1 | 6/2022 | Khoshnevisan et al. |
| 2022/0210814 A1 | 6/2022 | Khoshnevisan |
| 2022/0345908 A1 | 10/2022 | Takano et al. |
| 2023/0051329 A1 | 2/2023 | Flordelis et al. |

FOREIGN PATENT DOCUMENTS

| | | |
|---|---|---|
| EP | 3536101 A1 | 9/2019 |
| JP | 2001526510 A | 12/2001 |
| JP | 2013501480 A | 1/2013 |
| WO | WO-2014130893 A2 | 8/2014 |
| WO | WO-2017204546 A1 | 11/2017 |
| WO | WO-2018075205 A1 | 4/2018 |
| WO | WO-2018085709 A1 | 5/2018 |
| WO | WO-2018144844 A1 | 8/2018 |
| WO | WO-2019014041 A1 | 1/2019 |
| WO | WO-2019029609 A1 | 2/2019 |
| WO | WO-2019140256 A1 | 7/2019 |
| WO | WO-2019192005 A1 | 10/2019 |
| WO | WO-2020020453 A1 | 1/2020 |
| WO | WO-2020096903 A1 | 5/2020 |
| WO | WO-2020101757 A1 | 5/2020 |
| WO | WO-2021041533 A1 | 3/2021 |
| WO | WO-2021144114 A1 | 7/2021 |

(56) References Cited

FOREIGN PATENT DOCUMENTS

| WO | WO-2021154737 A9 | 9/2021 |
|---|---|---|
| WO | WO-2022170622 A1 | 8/2022 |

OTHER PUBLICATIONS

Huawei et al., "Low Latency of SCell Activation", 3GPP Draft, 3GPP TSG RAN WG1 Meeting #96bis, R1-1903992, 3rd Generation Partnership Project (3GPP), Mobile Competence Centre, 650, Route Des Luciolas, F-06921 Sophia-Antipolis Cedex, France, vol. RAN WG1, No. Xi 'an, China, Apr. 8, 2019-Apr. 12, 2019, Apr. 7, 2019 (Apr. 7, 2019), XP051699403, 6 Pages, Retrieved from the Internet: URL:http://www.3gpp.org/ftp/Meetings%5F3GPP%5FSYNC/RAN1/Docs/R1%2D1903992%2Ezip [retrieved on Apr. 7, 2019] p. 2, paragraph 2.3—p. 3, paragraph 2.4 p. 4, paragraph 3 figures 3-5.
Fraunhofer Iis, et al., "Discussion on Signaling of Beam Correspondence", 3GPP TSG RAN WG1 Meeting #94bis, 3GPP Draft; R1-1811086_Discussion_on_Signaling_of_Beam_ Correspondence, 3rd Generation Partnership Project (3GPP), Mobile Competence Centre; 650, Route Des Luciolas; F-06921 Sophia-Antipolis Cedex, vol. RAN WG1, No. Chengdu, China; Oct. 8, 2018-Oct. 12, 2018, Sep. 28, 2018 (Sep. 28, 2018), 5 Pages, XP051518487, Retrieved from the Internet: URL: http://www.3gpp.org/ftp/tsg%5Fran/WG1%5FRL1/TSGR1%5F94b/Docs/R1%201811086%2Ezip [retrieved on Sep. 28, 2018], Sections 2-4; Figures 1-3.
Mediatek Inc: "Discussion on UL Beam Management Procedure", 3GPP TSG RAN WG1 Meeting #88, 3GPP Draft; R1-1702731 Discussion On UL Beam Management Procedure Final, 3rd Generation Partnership Project (3GPP), Mobile Competence Centre ; 650, Route Des Luciolas; F-06921 Sophia-Antipolis Cedex, vol. RAN WG1, No. Athens, Greece; Feb. 13, 2017-Feb. 17, 2017, Feb. 12, 2017 (Feb. 12, 2017), XP051209878, 4 Pages, Retrieved from the Internet: URL:http://www.3gpp.org/ftp/Meetings_3GPP_SYNC/RAN1/Docs/ [retrieved on Feb. 12, 2017]. sections 2-4.
Du, Y., et al., "Evaluation of PMI Feedback Schemes for MU-MIMO Pairing", IEEE Systems Journal, IEEE, US, vol. 4, No. 4, Dec. 1, 2010 (Dec. 1, 2010), XP011320688, pp. 505-510, ISSN: 1932-8184 p. 505.
International Search Report and Written Opinion—PCT/US2021/015032—ISA/EPO—dated May 6, 2021.
CATT: "Consideration on Multi-Beam Enhancements", 3GPP Draft; 3GPP TSG RAN WG1 Meeting #98, R1-1908603, 3rd Generation Partnership Project (3GPP), Mobile Competence Centre; 650, Route Des Luciolas; F-06921 Sophia-Antipolis Cedex; France, vol. RAN WG1, No. Prague, CZ; Aug. 26, 2019-Aug. 30, 2019, Aug. 17, 2019 (Aug. 17, 2019), XP051765211, 7 Pages, Retrieved from the Internet: URL: http://www.3gpp.org/ftp/tsg_ran/WG1_RL1/TSGR1_98/Docs/R1-1908603.zip [retrieved on Aug. 17, 2019], chapter 3; pp. 3,4, p. 2, paragraph section 2.1—p. 3, paragraph section 2.2.
Motorola Mobility, et al., "Power Control for Multi-Panel Uplink Transmission", 3GPP TSG RAN WG1 AH-1901, 3GPP Draft; R1-1900944-PC-EMIMO-OTHER-FINAL, 3rd Generation Partnership Project (3GPP), Mobile Competence Centre; 650, Route Des Luciolas; F-06921 Sophia-Antipolis Cedex; France, vol. RAN WG1, No. Taipei; Jan. 21, 2019-Jan. 25, 2019, 4 Pages, Jan. 20, 2019 (Jan. 20, 2019), XP051593788, Retrieved from the Internet: URL: http://www.3gpp.org/ftp/Meetings%5F3GPP%5FSYNC/RAN1/Docs/R1%2D1900944%2Ezip [retrieved on Jan. 20, 2019] p. 2, paragraph section 2.1—p. 3, paragraph section 2.2.

Samsung: "Discussions on NR UL Multi-Panel/Multi-TRP", 3GPP TSG RAN WG1 Meeting #90, 3GPP Draft; R1-1713579 UL Multi TRP Panel V0, 3rd Generation Partnership Project (3GPP), Mobile Competence Centre 650, Route Des Luciolas; F-06921 Sophia-Antipolis Cedex; France, vol. RAN WG1, No. Prague, Czechia; Aug. 21, 2017-Aug. 25, 2017, 3 Pages, Aug. 20, 2017 (Aug. 20, 2017), XP051316379, Retrieved from the Internet: URL: http://www.3gpp.org/ftp/Meetings_3GPP_SYNC/RAN1/Docs/ [retrieved on Aug. 20, 2017] p. 2-p. 3, figure 2.
Interdigital., et al., "Views on Panel Activation and Deactivation", 3GPP TSG RAN WG1 #98, 3GPP Draft; R1-1908233 Views on Panel Activation and Deactivation, 3rd Generation Partnership Project (3GPP), Mobile Competence Centre, 650, Route Des Luciolas, F-06921 Sophia-Antipolis Cedex, France, vol. RAN WG1, No. Prague, CZ; Aug. 26, 2019-Aug. 30, 2019, Aug. 16, 2019 (Aug. 16, 2019), 6 Pages, XP051764847, Retrieved from the Internet: URL: http://www.3gpp.org/ftp/tsg_ran/WG1_RL1/TSGR1_98/Docs/R1-1908233.zip, [retrieved on Aug. 16, 2019], Section 2, Section 3 (p. 5, gNB-Driven), figures 1-3.
Huawei, et al., "UL/DL BM for Latency/Overhead Reduction", 3GPP Draft, R1-1903974, 3GPP TSG RAN WG1 #96bis, 3rd Generation Partnership Project (3GPP), Mobile Competence Centre, 650, Route Des Luciolas, F-06921 Sophia-Antipolis Cedex, France, vol. RAN WG1, No. Xi'an, China, Apr. 8, 2019-Apr. 12, 2019, Apr. 7, 2019 (Apr. 7, 2019), XP051699387, 8 Pages, Retrieved from the Internet: URL:http://www.3gpp.org/ftp/Meetings%5F3GPP%5FSYNC/RAN1/Docs/R1%2D1903974%2Ezip [retrieved on Apr. 7, 2019] the Whole Document.
Lenovo, et al., "Discussion of Beam Failure Recovery for Carrier Aggregation", 3GPP Draft, 3GPP TSG RAN WG1 Meeting #92, R1-1804211_BFR, 3rd Generation Partnership Project (3GPP), Mobile Competence Centre, 650, Route Des Luciolas, F-06921 Sophia-Antipolis Cedex, France, vol. RAN WG1, No. Sanya, China, Apr. 16, 2018-Apr. 20, 2018, Apr. 6, 2018, XP051413160, 3 Pages, Retrieved from the Internet: URL:http://www.3gpp.org/ftp/tsg%5Fran/WG1%5FRL1/TSGR1%5F92b/Docs/, http://www.3gpp.org/ftp/tsg%5Fran/WG1%5FRL1/TSGR1%5F92b/Docs/, [retrieved on Apr. 6, 2018], p. 1, line 15-line 16 p. 2, line 6-line 16, the Whole Document.
Samsung: "Remaining Details on QCL", 3GPP Draft, 3GPP TSG RAN WG1 #90b, R1- 1717634-QCL V2, 3rd Generation Partnership Project (3GPP), Mobile Competence Centre, 650, Route Des Luciolas, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), XP051340820, 9 Pages, Retrieved from the Internet: URL:http://www.3gpp.org/ftp/Meetings_3GPP_SYNC/RAN1/Docs/ retrieved on Oct. 8, 2017] p. 6-p. 7 p. 3.
Moderator (Samsung): "Moderator Summary for Multi-Beam Enhancement: Proposal Categorization", 3GPP TSG RAN WG1 #102-e, R1-2006985, e-Meeting, Aug. 17, 2020-Aug. 28, 2020, 27 Pages, Aug. 25, 2020 (Aug. 25, 2020) sections 1-2, section 4.1, the whole document.
Raghavan, et al., "Antenna Placement and Performance Tradeoffs With Hand Blockage in Millimeter Wave Systems", IEEE, Apr. 2019 (Year: 2019), 16 Pages.
Ali A., et al., "Spatial Covariance Estimation for Millimeter Wave Hybrid Systems using Out-of-Band Information", May 2019, Center for Transportation Research, pp. 1-14.
Jain I. K., "Millimeter Wave Beam Training: A Survey", arXiv, Sep. 2018, 2 Pages.
Zheng Z., et al., "Time of Arrival and Time Sum of Arrival Based NLOS Identification and Localization", IEEE 2012, 5 Pages.

\* cited by examiner

BEAM FAILURE RECOVERY ASSISTANCE IN UPPER BAND MILLIMETER WAVE WIRELESS COMMUNICATIONS

CROSS REFERENCE

The present Application for Patent claims the benefit of U.S. Provisional Patent Application No. 62/966,511 by Raghavan et al., entitled "BEAM FAILURE RECOVERY ASSISTANCE IN UPPER BAND MILLIMETER WAVE WIRELESS COMMUNICATIONS," filed Jan. 27, 2020, assigned to the assignee hereof, and expressly incorporated by reference in its entirety herein.

INTRODUCTION

The following relates to wireless communications and more specifically to techniques for beam failure recovery for uplink and downlink beams.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method of wireless communications at a first wireless device is described. The method may include establishing an uplink connection with a second wireless device using a first beam and a downlink connection with the second wireless device using a second beam that is different from the first beam, initiating a first radio link monitoring process for the first beam on the uplink connection and a second radio link monitoring process for the second beam on the downlink connection, and transmitting a radio link failure indication to the second wireless device based on a radio link failure, where the radio link failure is based on one or more of the first radio link monitoring process or the second radio link monitoring process.

An apparatus for wireless communications at a first wireless device is described. The apparatus may include a processor and memory coupled to the processor, the processor and memory configured to establish an uplink connection with a second wireless device using a first beam and a downlink connection with the second wireless device using a second beam that is different from the first beam, initiate a first radio link monitoring process for the first beam on the uplink connection and a second radio link monitoring process for the second beam on the downlink connection, and transmit a radio link failure indication to the second wireless device based on a radio link failure, where the radio link failure is based on one or more of the first radio link monitoring process or the second radio link monitoring process.

Another apparatus for wireless communications at a first wireless device is described. The apparatus may include means for establishing an uplink connection with a second wireless device using a first beam and a downlink connection with the second wireless device using a second beam that is different from the first beam. The apparatus may also include means for initiating a first radio link monitoring process for the first beam on the uplink connection and a second radio link monitoring process for the second beam on the downlink connection. The apparatus may also include means for transmitting a radio link failure indication to the second wireless device based on a radio link failure, where the radio link failure is based on one or more of the first radio link monitoring process or the second radio link monitoring process.

A non-transitory computer-readable medium storing code for wireless communications at a first wireless device is described. The code may include instructions executable by a processor to establish an uplink connection with a second wireless device using a first beam and a downlink connection with the second wireless device using a second beam that is different from the first beam. The code may also include instructions executable by a processor to initiate a first radio link monitoring process for the first beam on the uplink connection and a second radio link monitoring process for the second beam on the downlink connection. The code may also include instructions executable by a processor to transmit a radio link failure indication to the second wireless device based on a radio link failure, where the radio link failure is based on one or more of the first radio link monitoring process or the second radio link monitoring process.

In some examples of the method, apparatuses, and non-transitory computer-readable medium described herein, the first radio link monitoring process is independent of the second radio link monitoring process.

In some examples of the method, apparatuses, and non-transitory computer-readable medium described herein, one or more of the first radio link monitoring process or the second radio link monitoring process may include operations, features, means, or instructions for measuring an associated metric of the first beam or the second beam including at least one of a RSRP, a RSRQ, a SNR, a SINR, or a RSSI, for the one or more reference signals associated with the first beam or the second beam, and determining that the associated metric for the one or more reference signals has dropped below a threshold value on at least a configured number of occasions.

In some examples of the method, apparatuses, and non-transitory computer-readable medium described herein, one or more of the threshold value of the associated metric or the configured number of occasions, are different for the first beam and the second beam. In some examples of the method, apparatuses, and non-transitory computer-readable medium described herein, the radio link failure indication for the second beam is reported as a downlink control channel failure and is transmitted to the second wireless device using the first beam. In some examples of the method, apparatuses, and non-transitory computer-readable medium described herein, the radio link failure indication provides one or more candidate beams for a beam training procedure.

Some examples of the method, apparatuses, and non-transitory computer-readable medium described herein may further include operations, features, means, or instructions for receiving, from the second wireless device responsive to the radio link failure indication, a beam training indication that provides a resource and beam information for the beam training procedure, and initiating the beam training procedure responsive to the beam training indication. Some examples of the method, apparatuses, and non-transitory computer-readable medium described herein may further include operations, features, means, or instructions for measuring one or more reference signals from one or more training beams received from the second wireless device, and transmitting a measurement report to the second wireless device based on the measuring.

In some examples of the method, apparatuses, and non-transitory computer-readable medium described herein, the transmitting the radio link failure indication may include operations, features, means, or instructions for determining that a triggering event has occurred based on one or more counters associated with one or more beam quality thresholds, and transmitting the radio link failure indication responsive to an occurrence of the triggering event. In some examples of the method, apparatuses, and non-transitory computer-readable medium described herein, the transmitting the radio link failure indication may include operations, features, means, or instructions for reporting an indication of whether a metric associated with the second beam has dropped below a threshold value for use in a beam recovery procedure based on one or more indications that the metric associated with the second beam has dropped below the threshold value.

In some examples of the method, apparatuses, and non-transitory computer-readable medium described herein, one or more of the first beam or the second beam use a millimeter wave frequency band that includes frequencies that are greater than 24.25 GHz. In some examples of the method, apparatuses, and non-transitory computer-readable medium described herein, the first wireless device is a UE, a base station, a customer premises equipment (CPE), a relay device, a router, a repeater, or an integrated access and backhaul (IAB) node, and the second wireless device is a UE, a base station, a CPE, a relay device, a router, a repeater, or an IAB node.

A method of wireless communications at a second wireless device is described. The method may include establishing an uplink connection with a first wireless device using a first beam and a downlink connection with the first wireless device using a second beam that is different from the first beam, transmitting signaling to the first wireless device with one or more radio link monitoring parameters for each of a first radio link monitoring process associated with the first beam and a second radio link monitoring process associated with the second beam, where the first RLM process is different from the second RLM process, receiving a radio link failure indication from the first wireless device indicating that one or more of the first beam or the second beam has a radio link failure, and initiating a beam recovery procedure with the first wireless device responsive to receiving the radio link failure indication.

An apparatus for wireless communications at a second wireless device is described. The apparatus may include a processor and memory coupled to the processor, the processor and memory configured to establish an uplink connection with a first wireless device using a first beam and a downlink connection with the first wireless device using a second beam that is different from the first beam, transmit signaling to the first wireless device with one or more radio link monitoring parameters for each of a first radio link monitoring process associated with the first beam and a second radio link monitoring process associated with the second beam, where the first RLM process is different from the second RLM process, receive a radio link failure indication from the first wireless device indicating that one or more of the first beam or the second beam has a radio link failure, and initiate a beam recovery procedure with the first wireless device responsive to receiving the radio link failure indication.

Another apparatus for wireless communications at a second wireless device is described. The apparatus may include means for establishing an uplink connection with a first wireless device using a first beam and a downlink connection with the first wireless device using a second beam that is different from the first beam. The apparatus may also include means for transmitting signaling to the first wireless device with one or more radio link monitoring parameters for each of a first radio link monitoring process associated with the first beam and a second radio link monitoring process associated with the second beam, where the first RLM process is different from the second RLM process. The apparatus may also include means for receiving a radio link failure indication from the first wireless device indicating that one or more of the first beam or the second beam has a radio link failure. The apparatus may also include means for initiating a beam recovery procedure with the first wireless device responsive to receiving the radio link failure indication.

A non-transitory computer-readable medium storing code for wireless communications at a second wireless device is described. The code may include instructions executable by a processor to establish an uplink connection with a first wireless device using a first beam and a downlink connection with the first wireless device using a second beam that is different from the first beam. The code may also include instructions executable by a processor to transmit signaling to the first wireless device with one or more radio link monitoring parameters for each of a first radio link monitoring process associated with the first beam and a second radio link monitoring process associated with the second beam, where the first RLM process is different from the second RLM process. The code may also include instructions executable by a processor to receive a radio link failure indication from the first wireless device indicating that one or more of the first beam or the second beam has a radio link failure. The code may also include instructions executable by a processor to initiate a beam recovery procedure with the first wireless device responsive to receiving the radio link failure indication.

In some examples of the method, apparatuses, and non-transitory computer-readable medium described herein, the first radio link monitoring process is independent of the second radio link monitoring process. In some examples of the method, apparatuses, and non-transitory computer-readable medium described herein, the one or more radio link monitoring parameters include one or more threshold values for a reference signal received power associated with one or more of the first beam or the second beam, a number of occasions of reference signal received power dropping below the one or more threshold values, or any combinations thereof.

In some examples of the method, apparatuses, and non-transitory computer-readable medium described herein, one or more of the threshold values or the number of occasions are different for the first beam and the second beam. In some examples of the method, apparatuses, and non-transitory computer-readable medium described herein, the radio link failure indication for the second beam is reported as a downlink control channel failure and is received from the first wireless device via the first beam. In some examples of the method, apparatuses, and non-transitory computer-readable medium described herein, the radio link failure indication provides one or more candidate beams for a beam training procedure.

In some examples of the method, apparatuses, and non-transitory computer-readable medium described herein, the initiating the beam recovery procedure may include operations, features, means, or instructions for transmitting a beam training indication to the first wireless device that provides a resource and beam information for the beam training procedure, and initiating the beam training procedure responsive to the beam training indication. Some examples of the method, apparatuses, and non-transitory computer-readable medium described herein may further include operations, features, means, or instructions for transmitting one or more training beams to the first wireless device, and receiving a measurement report from the first wireless device that indicates one or more measurements associated with the one or more training beams.

In some examples of the method, apparatuses, and non-transitory computer-readable medium described herein, the receiving the radio link failure indication may include operations, features, means, or instructions for receiving two or more indications of whether a reference signal received power associated with the second beam is above or below a threshold value, and determining to initiate the beam recovery procedure based on the two or more indications showing that the reference signal received power associated with the second beam may have dropped below the threshold value.

In some examples of the method, apparatuses, and non-transitory computer-readable medium described herein, one or more of the first beam or the second beam use a millimeter wave frequency band that includes frequencies that are greater than 24.25 GHz. In some examples of the method, apparatuses, and non-transitory computer-readable medium described herein, the first wireless device is a UE, a base station, a CPE, a relay device, a router, a repeater, or an IAB node, and the second wireless device is a UE, a base station, a CPE, a relay device, a router, a repeater, or an IAB node.

DETAILED DESCRIPTION

Figure 1:
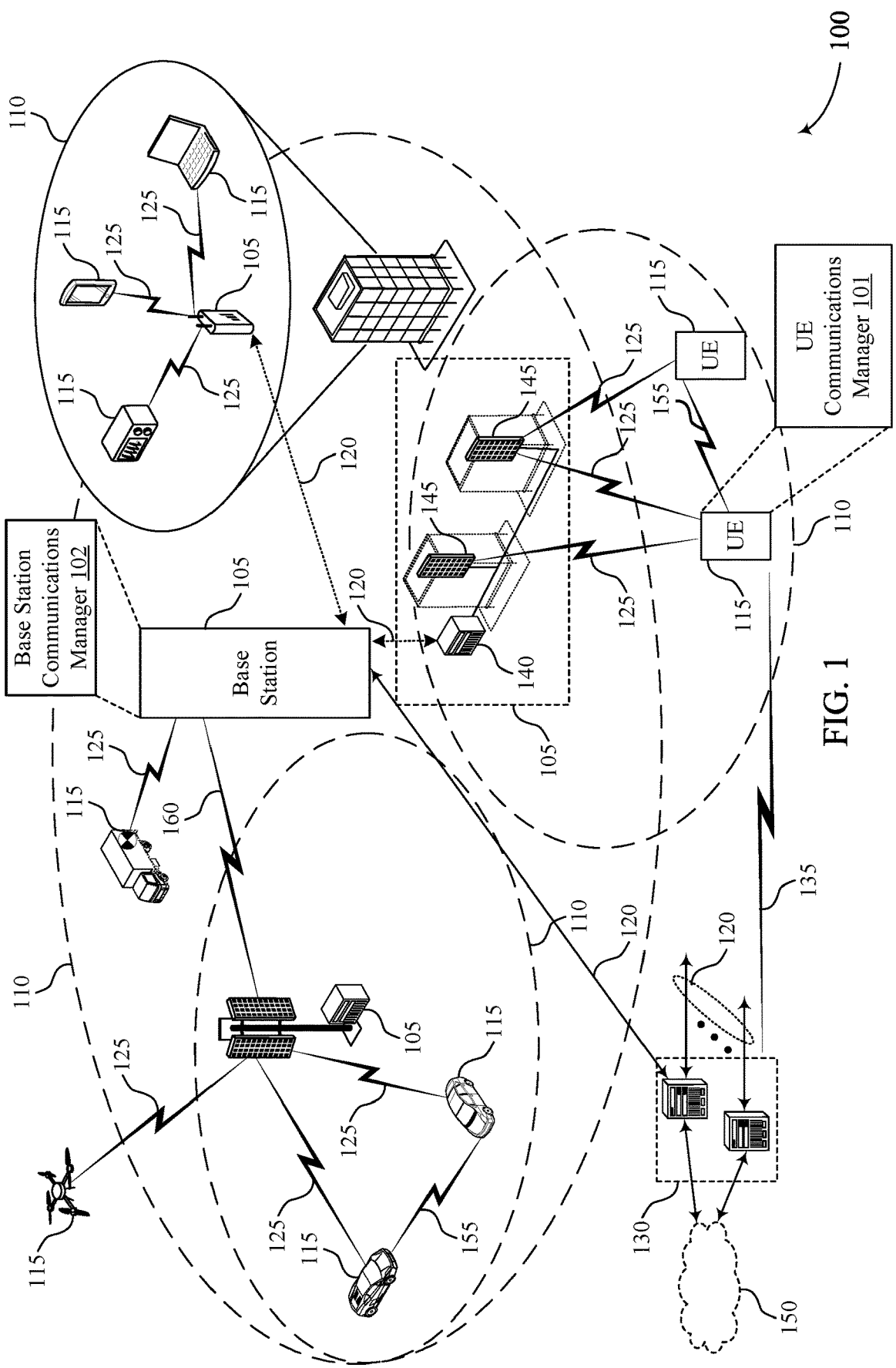
FIG. 1 illustrates an example of a system for wireless communications that supports beam failure recovery assistance in upper band millimeter wave wireless communications in accordance with one or more aspects of the present disclosure.

In some deployments, wireless communications systems may operate in millimeter wave (mmW) frequency ranges (e.g., 24 GHz, 24.25 GHz, 26 GHz, 28 GHz, 39 GHz, 52.6-71 GHz, etc.). Wireless communications at these frequencies may be associated with increased signal attenuation (e.g., path loss, penetration loss, blockage loss), which may be influenced by various factors, such as diffraction, propagation environment, density of blockages, material properties, etc. As a result, signal processing techniques, such as beamforming, may be used to coherently combine energy and overcome the path losses at these frequencies. Due to the increased amount of path, penetration, and blockage losses in mmW communications systems, transmissions between wireless devices (e.g., from a base station and/or a UE) may be beamformed. Moreover, a receiving device may use beamforming techniques to configure antenna(s) and/or antenna array(s) and/or antenna array module(s) such that transmissions are received in a directional manner.

In some deployments, communications in mmW frequencies may utilize what is referred to as frequency range 2 (FR2), corresponding to deployments in 24-52.6 GHz (e.g., 24 GHz. 26 GHz, 28 GHz, 39 GHz, etc.). As demand for wireless communications increases, additional mmW frequencies may be desirable for some deployments, such as frequency range 4 (FR4) (also informally known as or upper mmW bands) which may be associated with 52.6 GHz and beyond. In many FR2 deployments, wireless devices use antenna modules that include a number of antenna elements, such as an array of four antenna elements per module in a 4×1 array arrangement, among other example configurations. Upper mmW bands have shorter wavelengths, and thus more antenna elements can be placed in the same physical aperture in FR4 than at FR2. For example, an FR4 device may have multiple antenna modules that each contain four 4×4 subarrays. In some cases, it may be easier for a wireless device (e.g., a UE) to use or manage some possible combinations of antenna elements across subarrays within an antenna module or across antenna modules than others.

In some cases, different antenna elements within an antenna module or across one or more different antenna modules may be used for transmitting and receiving communications. For example, power constraints, thermal management, or maximum permissible exposure (MPE) limits may result in a transmit beam at a wireless device that is different than a receive beam at the wireless device, thus resulting in a transmit beam (e.g., uplink beam) that is decoupled from a receive beam (e.g., a downlink beam). In one or more aspects, when referring to decoupled beams, reference is made to transmit and receive beams at a wireless device that are not quasi co-located (QCL), use different beamforming parameters, use different antenna elements or different antenna modules, or any combinations thereof. Such decoupled beams may provide a wireless device with additional flexibility in beam management by allowing, for example, management of power control (e.g., by using fewer transmit antenna elements/modules than receive antenna elements/modules), manage thermal aspects (e.g., by switching transmissions away from or using fewer antenna elements at an antenna module that is approaching a thermal limit), manage MPE (e.g., by using antenna modules that reduce radio frequency (RF) exposure), and the like. When decoupled beams are used, in one or more aspects, beam training procedures (e.g., P1/P2/P3 beam training procedures in NR) used to identify a preferred receive beam may not be useful for identifying a transmit beam, and thus additional beam training may be performed to establish both transmit and receive beams. Additionally, in the event of a beam failure of one of the beams, the other beam may not experience the same failure, and may continue to support communications.

Various aspects of the present disclosure provide that a first wireless device may perform separate radio link monitoring (RLM) procedures to monitor beam (e.g., uplink or downlink transmissions that have been beamformed) quality for both transmit and receive beams that are used for communications with a second wireless device. For example, a first RLM procedure used to monitor beam quality of a transmit beam may be different from (e.g., may have different or separate RLM monitoring parameters, or may be independent processes (e.g., one process does not rely on the other process)) a second RLM procedure used to monitor beam quality of a receive beam, or vice versa. The separate RLM procedures may be used at the first wireless device to determine that one of the transmit or receive beams is experiencing a quality degradation or a radio link failure based on one or more RLM parameters or metric, and a radio link failure (RLF) indication may be provided to the second wireless device. The RLF indication may indicate that one or more of the metrics for RLF have been satisfied. In cases where an RLF of a receive beam is indicated, the transmit beam may be used to provide the RLF indication. In cases where an RLF of a transmit beam is indicated, the indication may be provided using random access channel resources, or in some cases may be provided in a separate low-band (e.g., FR1) connection between the wireless devices. In response to the RLF indication, the second wireless device may initiate a beam recovery procedure, such as a beam training procedure, to identify a suitable beam to use for further communications. In some cases, the RLF indication may provide information related to one or more preferred beams, and the beam training procedure may be determined based on the one or more preferred beams, which may allow for a more efficient beam training procedure. In some cases, the first wireless device may provide an indication in communications with the second wireless device of whether a beam quality is above or below a threshold value, and the RLF may be triggered based on a number of times the beam quality dropped below the threshold. The first wireless device and second wireless device may be any wireless device used in a wireless communications system, such as a UE, a base station, a CPE, a relay device, a router, a repeater, or an IAB node, for example.

Such techniques may be useful to indicate an RLF of one or more beams and facilitate efficient recovery from such an RLF. Thus, providing indications of RLF may allow for communications to be configured so as to provide enhanced efficiency and reliability, while allowing a wireless device to select antenna components (e.g., antenna elements or modules for beamformed communications) that may be preferred at the wireless device. For example, the RLF may indicate a preferred beam or candidate beam (e.g., a beam that has yet to meet one or more of the RLF metrics for RLF determination) for a beam recovery procedure that may be selected to help reduce power consumption, manage thermal aspects of RF components, manage which antenna arrays or modules are active, and the like.

Aspects of the disclosure are initially described in the context of wireless communications systems. Examples of antenna modules and beam failure recovery assistance are then discussed for some aspects. Aspects of the disclosure are further illustrated by and described with reference to apparatus diagrams, system diagrams, and flowcharts that relate to beam failure recovery assistance in upper band millimeter wave wireless communications.

FIG. 1 illustrates an example of a wireless communications system 100 that supports beam failure recovery assistance in upper band millimeter wave wireless communications in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, repeater devices, CPE, IAB nodes, router devices, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. In some examples, the one or more base stations 105 may provide backhaul connectivity between another base station 105 and core network 130 via a backhaul link 160 while acting as an IAB node. A UE 115 may communicate with the core network 130 through a communication link 135.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays, routers, or CPE, as well as the base stations 105 and the network equipment including macro eNBs or gNBs, small cell eNBs or gNBs, IAB nodes, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 Megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

The electromagnetic spectrum is often subdivided, for example, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Signal waveforms transmitted over a carrier may be made up of multiple subcarriers (e.g., using multi-carrier modulation (MCM) techniques such as orthogonal frequency division multiplexing (OFDM) or DFT-s-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier.

One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 155 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 155 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). In some examples, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an EHF region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

UEs 115 may include one or more antenna modules that may include a relatively large number of antenna elements for mmW communications via one or more uplink beams and one or more downlink beams, and may be an example of a first wireless device as discussed herein. A UE communications manager 101 may manage mmW communications, and in some cases may initiate separate (e.g., having different or independent RLM parameters) RLM processes for uplink and downlink beams. In the event of that one or more RLM processes indicates an RLF, the UE communications manager 101 may transmit an indication of RLF to a second wireless device (e.g., a base station 105). In some cases, the second wireless device may initiate a beam recovery procedure based on the RLF indication.

One or more of the base stations 105 may be an example of a second wireless device as discussed herein, and may include a base station communications manager 102. The base station communications manager 102 may configure a first wireless device (e.g., a UE 115) with one or more RLM parameters for each of two or more RLM processes at the first wireless device, and may receive an RLF indication from the first wireless device indicating that one or more beams have had an RLF. Additionally or alternatively, configuring the first wireless device with the one or more RLM parameters may include transmitting signaling (e.g., beam management configuration signaling, radio resource control (RRC) signaling, DCI, or the like) that includes the one or more radio link parameters. The base station communications manager 102, responsive to the RLF indication, may initiate a beam recovery procedure with the first wireless device, such as a beam training procedure that may be used to determine one or more beams to be used for communications using one or more of different groups of antenna elements at the first wireless device.

Figure 2:
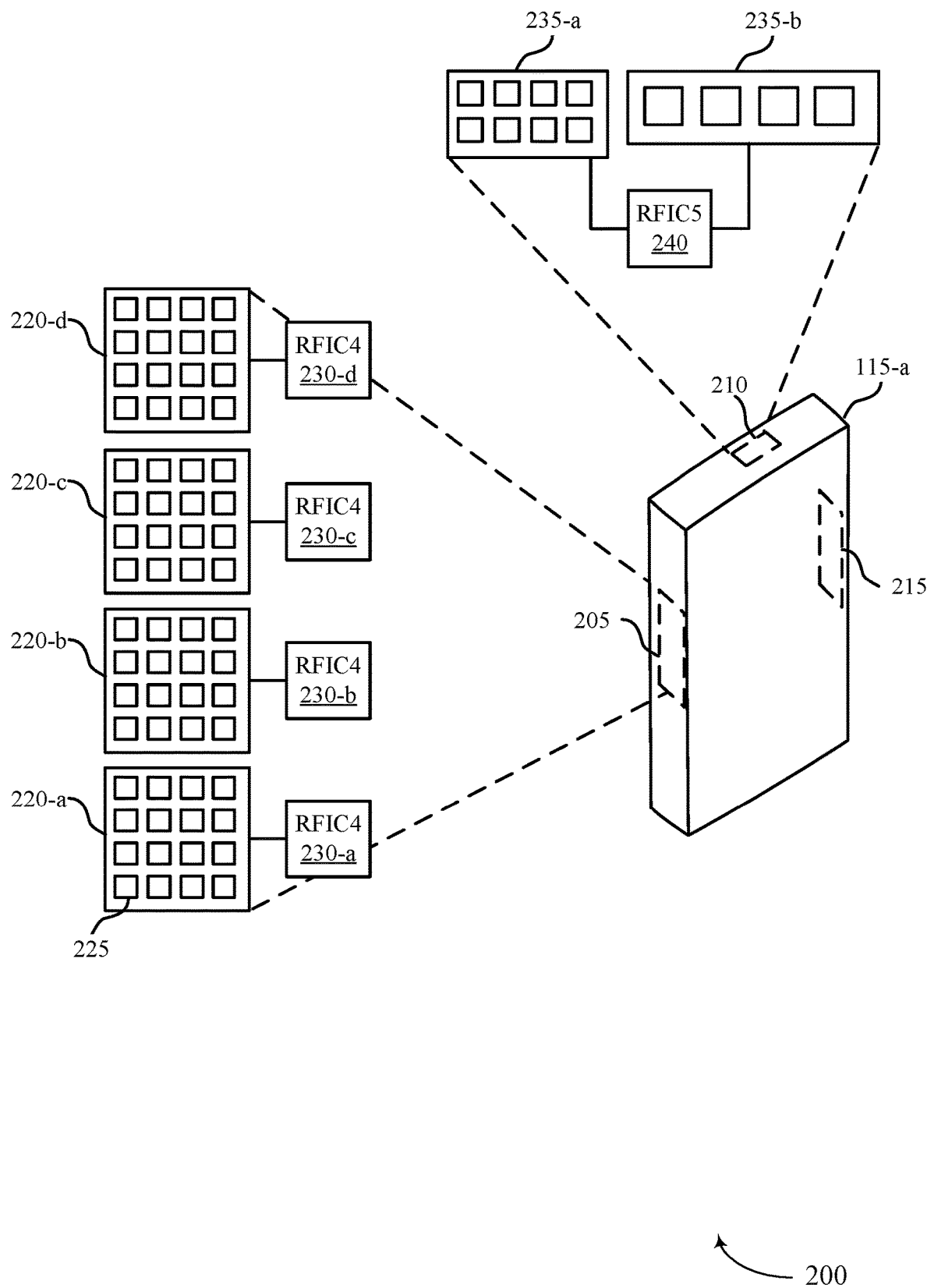
FIG. 2 illustrates an example of a wireless communication device with multiple antenna arrays that supports beam failure recovery assistance in upper band millimeter wave wireless communications in accordance with one or more aspects of the present disclosure.

FIG. 2 illustrates an example of a wireless communication device 200 with multiple antenna arrays that supports beam failure recovery assistance in upper band millimeter wave wireless communications in accordance with one or more aspects of the present disclosure. In some examples, wireless communication device 200 may implement aspects of wireless communications system 100. In this example, the wireless communication device 200 may be a UE 115-*a*, although in other cases the wireless communication device 200 may be a different device, such as a CPE, a relay device, a router, a repeater, or an IAB node.

In this example, the UE 115-*a* includes a number of different antenna modules, including a first antenna module 205, a second antenna module 210, and a third antenna module 215. Each of the antenna modules 205 through 215 may include a number of subarrays 220 of antenna elements. In this example, the first antenna module 205 may include four subarrays 220, including a first subarray 220-*a*, a second subarray 220-*b*, a third subarray 220-*c*, and a fourth subarray 220-*d*. Each subarray 220 in this example may include 16 individual antenna elements 225 arranged in a 4×4 array configuration. Each antenna element 225, in some cases, may be a patch antenna element configured to communicate in a high-band mmW deployment. In some cases, the spacing of antenna elements 225 within each subarray 220 may be configured to provide for efficient analog beamforming at wavelengths associated with high-band mmW communications. Further, in this example, each subarray 220 may include an associated radio frequency integrated circuit (RFIC) 230.

In the example of FIG. 2, the second antenna module 210 also may include multiple subarrays 235, including a fifth subarray 235-*a* and a sixth subarray 235-*b*. In this example, the fifth subarray 235-*a* includes eight antenna elements arranged in a 4×2 array configuration, and the sixth subarray 235-*b* includes four antenna elements arranged in a 4×1 array configuration. In this case, a single RFIC (RFICS) 240 may be coupled with the subarrays 235, although multiple RFICs may be used or an RFIC may be shared with one or more other of the antenna modules 205 or 215. While the antenna module 210 is illustrated as having multiple subarrays 235 that are different sizes, other examples may have a same number of subarrays 235 with each subarray having a same size (e.g., four 4×4 antenna subarrays similarly as illustrated in the first antenna module 205). Techniques as discussed herein may be applied to any numbers of antenna modules 205 through 215, any numbers of subarrays included in each antenna module, any numbers of antennas per subarray, or any combinations thereof.

As discussed herein, multiple RFICs 230 and associated antenna subarrays 220 may be used at different times by the wireless device. For example, in the case of FIG. 2 where the wireless device is UE 115-*a*, it may be desirable to operate using a subset of the antenna modules 205-215, using a subset of antenna subarrays 220 and associated RFICs 230, using a subset of antenna elements 225 within one or more subarrays 220, or any combinations thereof. Such operations may allow the UE 115-*a* to manage power consumption in order to reduce power used by RF components, for example. In other cases, the UE 115-*a* may determine, in addition or alternatively to power consumption considerations, that one or more MPE limitations, one or more thermal limitations, or combinations thereof, make it desirable to use certain groups of antenna elements 225 of one or more subarrays 220. Thus, even though a relatively large number of antenna elements 225 are available at the UE 115-*a*, not all elements may be used at any particular instant in time.

In some cases, the UE 115-*a* may use decoupled uplink and downlink beams and may perform separate RLM procedures (e.g., different, independent, or the like) for the uplink and downlink beams. The separate RLM procedures may be used to determine that one of the uplink or downlink beams is experiencing a quality degradation or an RLF, and an RLF indication may be provided to the second wireless device, such as a serving base station. In cases where an RLF of a downlink beam is indicated, the uplink beam may be used to provide the RLF indication. In cases where an RLF of an uplink beam is indicated, the indication may be provided using random access channel (RACH) resources (e.g., in a random access request that indicates RLF and is transmitted using indicated random access resources), or in some cases may be provided in a separate low-band (e.g., FR1) connection between the UE 115-*a* and second wireless device. In response to the RLF indication, the second wireless device may initiate a beam recovery procedure, such as a beam training procedure, to identify a suitable beam to use for further communications. Various examples of RLF determination, RLF indications, and beam recovery procedures are discussed with reference to FIGS. 3 and 4.

Figure 3:
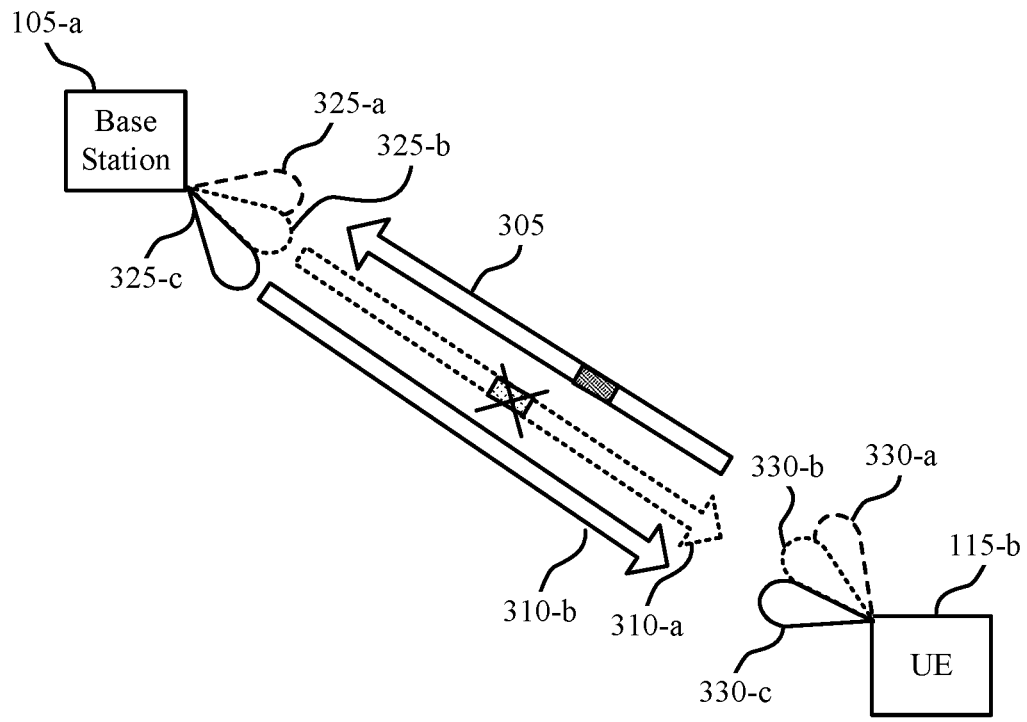
FIG. 3 illustrates an example of a wireless communications system that supports beam failure recovery assistance in upper band millimeter wave wireless communications in accordance with one or more aspects of the present disclosure.

FIG. 3 illustrates an example of a wireless communications system 300 that supports beam failure recovery assistance in upper band millimeter wave wireless communications in accordance with one or more aspects of the present disclosure. In some examples, wireless communications system 300 may implement aspects of wireless communications system 100. In some examples, the wireless communications system 300 may include a UE 115-*b*, and a base station 105-*a* which may be examples of UEs 115 and base stations 105 described with reference to FIGS. 1-2. Further, UE 115-*b* may be an example of a first wireless device, and the base station 105-*a* may be an example of a second wireless device. The UE 115-*b* and base station 105-*a* may communicate using beamformed communications in which the UE 115-*b* transmits uplink communications 305 to the base station 105-*a*, and the base station 105-*a* transmits downlink communications 310 to the UE 115-*b*.

In some cases, the UE 115-*b* may include a relatively large number of antenna elements, which may be spread across one or more antenna subarrays and one or more antenna modules, and used for high-band mmW beamformed communications. In some cases, the UE 115-*b* and base station 105-*a* may establish a connection in which the uplink communications 305 use an uplink beam and the downlink communications 310 use a downlink beam, where the uplink beam and the downlink beam are decoupled. The uplink and downlink beams may be established using a beam training procedure, where different base station beams 325 and different UE beams 330 may be tested and measured to identify preferred beams for communications. For example, the UE 115-*b* may measure reference signals 320 of multiple base station beams 325 using multiple UE beams 330 and select a preferred beam, and provide feedback to the base station 105-*a* on the selected beam, such as through a chosen transmission configuration indication (TCI) state. In some cases, the UE 115-*b* may transmit a CSI measurement report to the base station 105-*a* based on measurements of the beam training procedure. In some cases, the uplink beam and the downlink beam may have TCI states that are not QCL, and thus the beams are decoupled.

Such decoupled beams may provide the UE 115-*b* with additional flexibility in beam management by allowing, for example, management of power control (e.g., by using fewer transmit antenna elements/modules than receive antenna elements/modules), management of thermal aspects (e.g., by switching transmissions away from or using fewer antenna elements at an antenna module that is approaching a thermal limit), manage MPE (e.g., by using antenna modules that reduce RF exposure), and the like. When decoupled beams are used, separate beam training procedures (e.g., P1/P2/P3 beam training procedures in NR) may be used to identify preferred uplink and downlink beams. Additionally, in the event of a beam failure of one of the beams, the other beam may not experience the same failure, and may continue to support communications.

In some cases, when different uplink and downlink beams are established for communications between the UE 115-*b* and the base station 105-*a*, the UE 115-*b* may initiate separate (e.g., different, independent, or the like) RLM processes for each of the uplink beam and the downlink beam. The separate RLM processes may be used to monitor beam quality for both the uplink and downlink beams, and may be used at the UE 115-*b* to determine that one of the uplink or downlink beams is experiencing a quality degradation or an RLF. Based on the determination of a quality degradation that exceeds a threshold, and an RLF indication 315 may be provided to the base station 105-*a*. In cases where an RLF of a receive beam is indicated, the transmit beam for uplink communications 305 may be used to provide the RLF indication 315. In cases where an RLF of a transmit beam is determined, the RLF indication 315 may be provided using random access channel resources (e.g., FR1, FR2, or FR4 RACH resources), or in some cases may be provided in a separate low-band (e.g., FR1) connection (e.g., on an anchor carrier that is established using FR1). In response to the RLF indication 315, the base station 105-*a* may initiate a beam recovery procedure, such as a beam training procedure, to identify a new beam. In the example, of FIG. 3, the RLF indication 315 may indicate a failure in the downlink beam 325-*b*, and a second downlink beam 325-*c* may be established for subsequent downlink communications 310-*b* to the UE 115-*b*. In some cases, the RLF indication 315 may be reported as a downlink control channel failure that is transmitted to the base station 105-*a*.

In some cases, the RLF indication 315 may provide information related to one or more preferred beams. For example, the RLF indication may provide a beam index from a previously configured set of available beams, and the beam training procedure may be determined based on the one or more preferred beams (e.g., by performing a beam sweep of the preferred beam(s) and one or more other beams that have similar beamforming characteristics), which may allow for an efficient beam training procedure (e.g., a beam sweep may be performed in a single slot with a relatively high likelihood of identifying a suitable beam for subsequent communications).

In some cases, the UE 115-*b* may provide an indication in communications with the base station 105-*a* of whether a beam quality of the uplink or downlink beam, or both, is above or below a threshold. In some examples, the UE 115-*b* may provide a flag in each slot that indicates whether an associated metric of the uplink beam or the downlink beam (or separate flags for each) is at or above a threshold value or below the threshold value. The associated metric may include, for example, a reference signal received power (RSRP), a reference signal received quality (RSRQ), a signal-to-noise ratio (SNR), a signal-to-interference and noise ratio (SINR), or a reference signal strength indicator (RSSI), for one or more reference signals associated with the uplink beam or the downlink beam. In some cases, the threshold value may be configured at the UE 115-*b* by the base station 105-*a* (e.g., in RRC signaling when establishing a beam, in a beam switch indication, in a medium access control (MAC) control element (CE), etc.), or may be a prespecified threshold value. In some cases, different threshold values may be provided for the uplink beam and the downlink beam.

In some cases, the RLF may be triggered based on a number of times a beam quality drops below the threshold value. In such cases, the UE 115-*b* as part of each RLM process may maintain a counter of a number of times that an associated metric of the uplink beam or downlink beam crosses the threshold value, and transmit the RLF indication 315 if the counter exceeds a limit (e.g., a limit value configured by the base station 105-*a* or a preconfigured limit value). In some cases, the counter may be based on a number of consecutive times that the associated metric is below a threshold (e.g., one or more consecutive RSRP measurements below the threshold), a number of times within a window that the associated metric is below the threshold (e.g., if two or more measurements of the most recent five measurements are below the threshold), a number of times within a time period that the associated metric is below the threshold (e.g., if one or more measurements within a frame or subframe are below the threshold), or any combinations thereof. In cases where the UE 115-*b* transmits a flag that indicates whether a measurement is above or below the threshold, the base station 105-*a* may maintain such a counter to trigger RLF and the beam recovery process.

Figure 4:
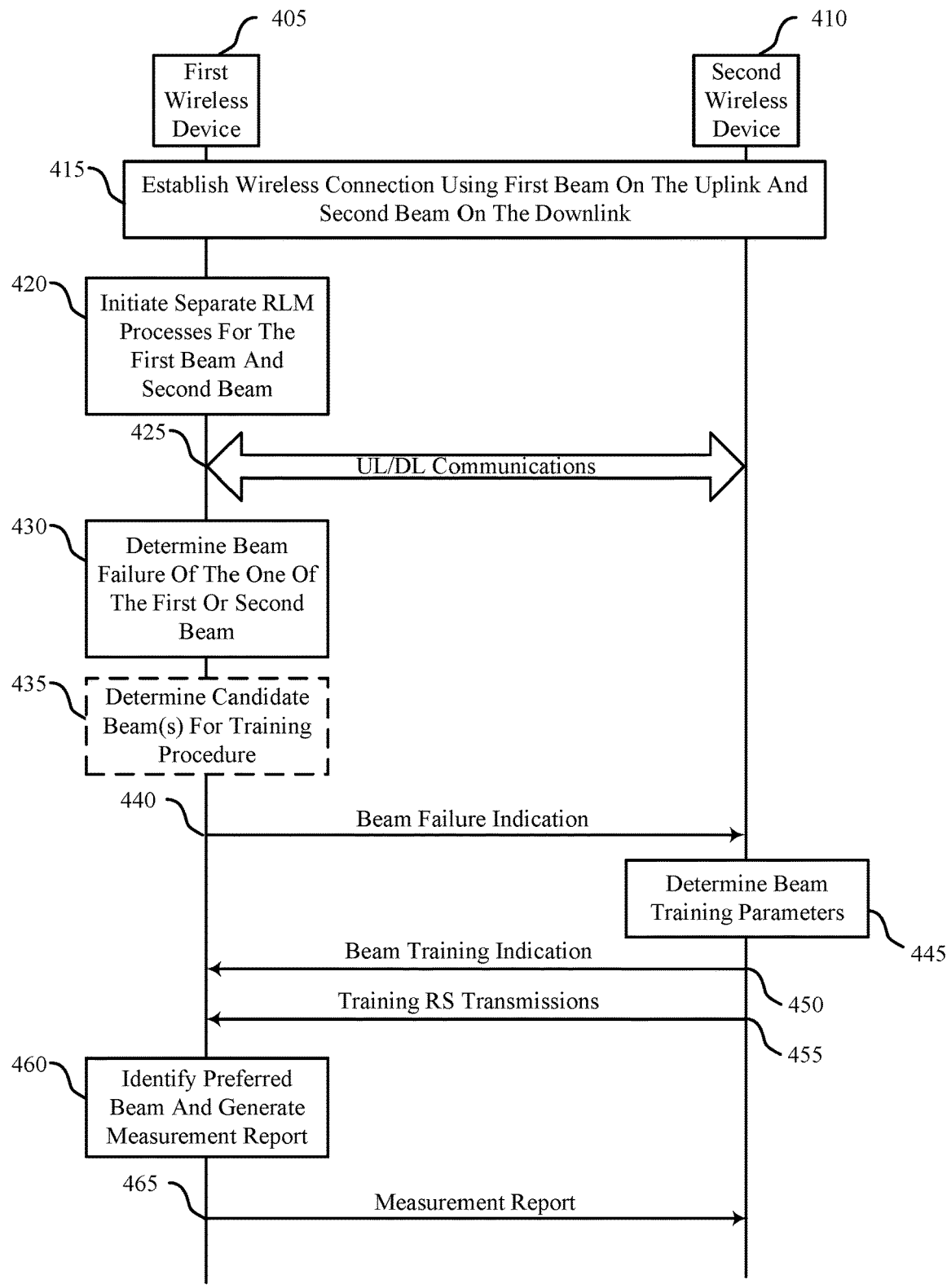
FIG. 4 illustrates an example of a process flow that supports beam failure recovery assistance in upper band millimeter wave wireless communications in accordance with one or more aspects of the present disclosure.

FIG. 4 illustrates an example of a process flow 400 that supports beam failure recovery assistance in upper band millimeter wave wireless communications in accordance with one or more aspects of the present disclosure. In some examples, process flow 400 may implement aspects of wireless communications system 100 or 300. Process flow 400 may be implemented by first wireless device 405 and a second wireless device 410 as described herein. In the following description of the process flow 400, the communications between the first wireless device 405 and the second wireless device 410 may be transmitted in a different order than the example order shown, or the operations performed by the first wireless device 405 and the second wireless device 410 may be performed in different orders or at different times. Some operations may also be omitted from the process flow 400, and other operations may be added to the process flow 400.

At 415, the first wireless device 405 and the second wireless device 410 may establish communications using a first beam on the uplink and a second beam on the downlink. The first beam and the second beam may be decoupled beams, that may be established according to a beam training procedure as part of an initial access of the first wireless device 405 at the second wireless device 410, as part of a beam training and refinement procedure, based on a beam switching procedure, and the like.

At 420, the first wireless device 405 may initiate separate (e.g., different, independent, or the like) RLM processes for the first beam and the second beam. In some cases, a first RLM process may be initiated for the first beam on the uplink, and a second RLM process may be initiated for the second beam on the downlink. In some cases, the first RLM process may have a first set of criteria for declaring an RLF, and the second RLM process may have a second set of criteria for declaring RLF that may be different than the first set of criteria. In some cases, the first wireless device 405 may initiate the separate RLM processes based on receiving signaling (e.g., beam management configuration signaling, RRC signaling, DCI, or the like) from the second wireless device 410 that includes the sets of criteria. At 425, the first wireless device 405 and the second wireless device 410 may transmit uplink and downlink communications using the established first beam and second beam. The first wireless device 405 may perform RLM based on the uplink and downlink communications.

At 430, the first wireless device 405 may determine a beam failure of one of the first beam or second beam, based on the RLM processes. As discussed herein, such a beam failure may be determined based on a measurement of one or more parameters of communications on the uplink or downlink beams, based on a counter associated with measurements that are below a configured threshold value, or any combinations thereof.

Optionally at 435, the first wireless device 405 may determine one or more candidate beams for a beam training procedure. In some cases, the one or more candidate beams may be determined based on one or more beams that have similar beam characteristics as the failed beam, but that may use one or more different antenna elements or different antenna panels. In some cases, the one or more candidate beams may be determined based on one or more of the first beam or the second beam that has not had an RLF (e.g., if a downlink beam has RLF, a beam that is QCL with the uplink beam may be identified as a candidate beam).

At 440, the first wireless device 405 may transmit a beam failure indication to the second wireless device 410 based on the determined radio link failure. As discussed herein, the beam failure indication of the downlink beam or receive beam of the first wireless device 405 may be transmitted using the uplink or transmit beam of the first wireless device 405. In other cases, the beam failure indication may be transmitted using random access resources (e.g., RACH resources in FR1, FR2, or FR4) that are configured for random access channel access by the second wireless device 410. In further cases, the beam failure indication may be provided in a low-band (e.g., FR1) connection between the first wireless device 405 and the second wireless device 410.

At 445, the second wireless device 410 may determine beam training parameters based on the beam failure indication. In some cases, the second wireless device 410 may identify particular beams that are suitable for communications based on an indication of one or more candidate beams that are included with the beam failure indication. At 450, the second wireless device 410 may transmit a beam training indication to the first wireless device 405. The beam training indication may indicate that one or more reference signals are to be transmitted using one or more beams in accordance with the determined beam training parameters. At 455, the second wireless device 410 may transmit reference signal transmissions (e.g., CSI reference signals using two or more determined beams) according to the determined beam training parameters.

At 460, the first wireless device 405 may measure received reference signals to identify a preferred beam, and generate a measurement report. At 465, the first wireless device may transmit a measurement report (e.g., a CSI measurement report), which may include an indication of a preferred beam that is identified at the first wireless device 405. The second wireless device 410 may then determine an updated beam for use in communications, and transmit an indication to the first wireless device 405 to initiate communications using the updated beam. Subsequently, the first wireless device 405 and the second wireless device 410 may communicate using one or more updated beams. In some cases, a new transmission or reception beam at the first wireless device 405 may use one or more of the groups of antenna elements that were identified by the first wireless device 405 when selecting a preferred beam or candidate beam, and may allow the first wireless device 405 to operate in a more power efficient manner, to manage thermal performance of device components, to manage MPE, or any combinations thereof.

Figure 5:
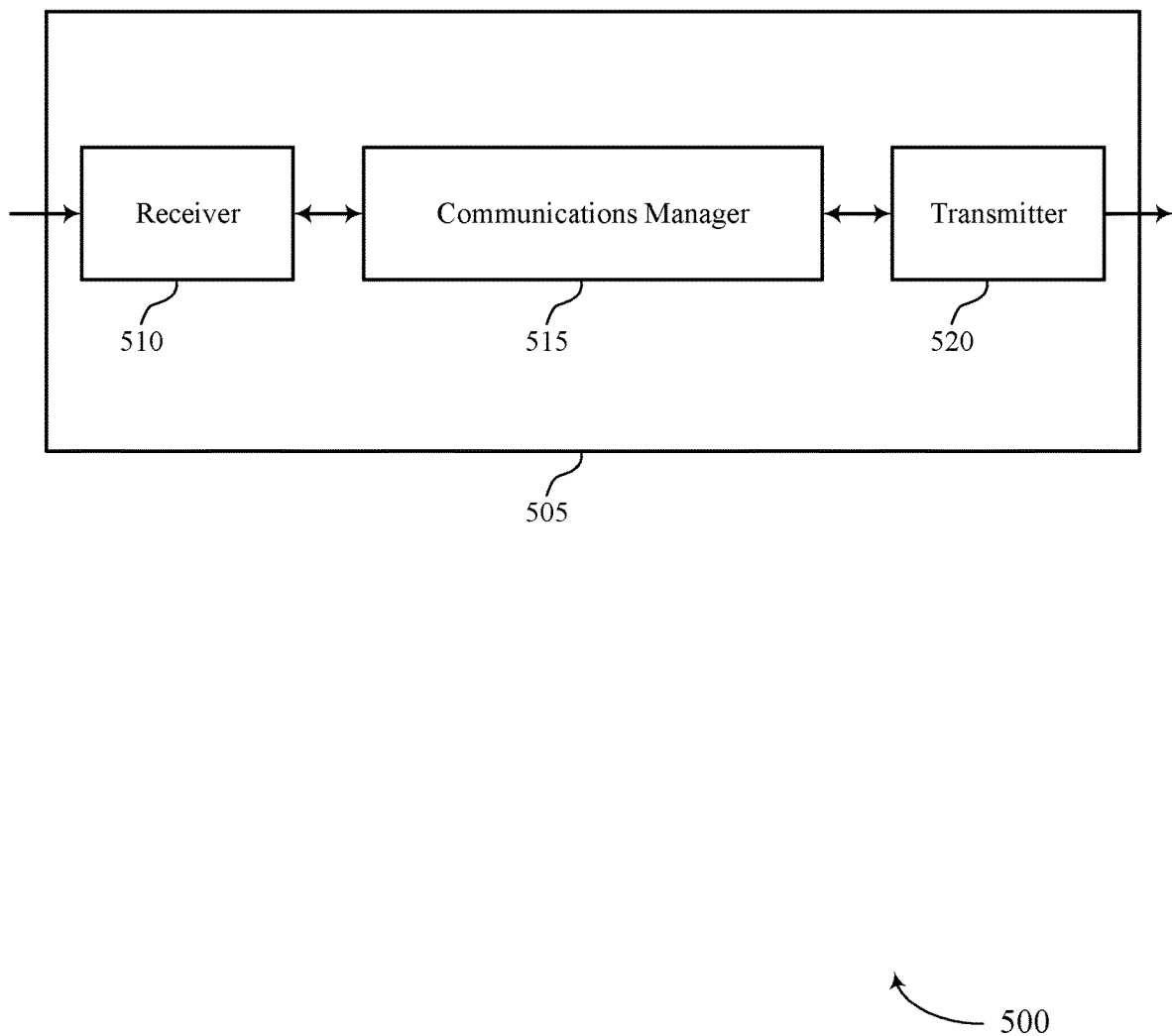
FIGS. 5 and 6 show block diagrams of devices that support beam failure recovery assistance in upper band millimeter wave wireless communications in accordance with one or more aspects of the present disclosure.

FIG. 5 shows a block diagram 500 of a device 505 that supports beam failure recovery assistance in upper band millimeter wave wireless communications in accordance with one or more aspects of the present disclosure. The device 505 may be an example of aspects of a first wireless device, such as a UE 115, as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to beam failure recovery assistance in upper band millimeter wave wireless communications, etc.). Information may be passed on to other components of the device 505. The receiver 510 may be an example of one or more aspects of the transceiver 820 described with reference to FIG. 8. The receiver 510 may utilize a single antenna or a set of antennas.

The communications manager 515 may establish an uplink connection with a second wireless device using a first beam and a downlink connection with the second wireless device using a second beam that is different from the first beam, initiate a first radio link monitoring process for the first beam on the uplink connection and a second radio link monitoring process for the second beam on the downlink connection, and transmit a radio link failure indication to the second wireless device based on a radio link failure, where the radio link failure is based on one or more of the first radio link monitoring process or the second radio link monitoring process. The communications manager 515 may be an example of one or more aspects of the communications manager 810 described herein.

The communications manager 515 may as described herein be implemented to realize one or more potential advantages. One implementation may allow the device 505 to maintain separate (e.g., different, independent, or the like) RLM processes for transmit and receive beams and to indicate RLF separately for each beam, which may allow for efficient indications of RLF and establishment of updated beams for beams that have experienced RLF. Further, implementations may allow the device 505 to have additional flexibility for power management, thermal management, or MPE management when using beamformed communications, among other advantages.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 515 may be an example of means for performing various aspects of managing beam failure recovery as described herein. The communications manager 515, or its sub-components, may be implemented in hardware (e.g., in communications management circuitry). The circuitry may comprise of processor, DSP, an ASIC, an FPGA or other programmable logic device, discrete gate or transistor logic, discrete hardware components, or any combination thereof designed to perform the functions described in the present disclosure.

In another implementation, the communications manager 515, or its sub-components, may be implemented in code (e.g., as communications management software or firmware) executed by a processor, or any combination thereof. If implemented in code executed by a processor, the functions of the communications manager 515, or its sub-components may be executed by a general-purpose processor, a DSP, an ASIC, an FPGA or other programmable logic device.

In some examples, the communications manager 515 may be configured to perform various operations (e.g., initiating, establishing, transmitting, measuring, determining, receiving, reporting) using or otherwise in cooperation with the receiver 510, the transmitter 520, or both.

The transmitter 520 may transmit signals generated by other components of the device 505. In some examples, the transmitter 520 may be collocated with a receiver 510 in a transceiver module. For example, the transmitter 520 may be an example of one or more aspects of the transceiver 820 described with reference to FIG. 8. The transmitter 520 may utilize a single antenna or a set of antennas.

Figure 6:
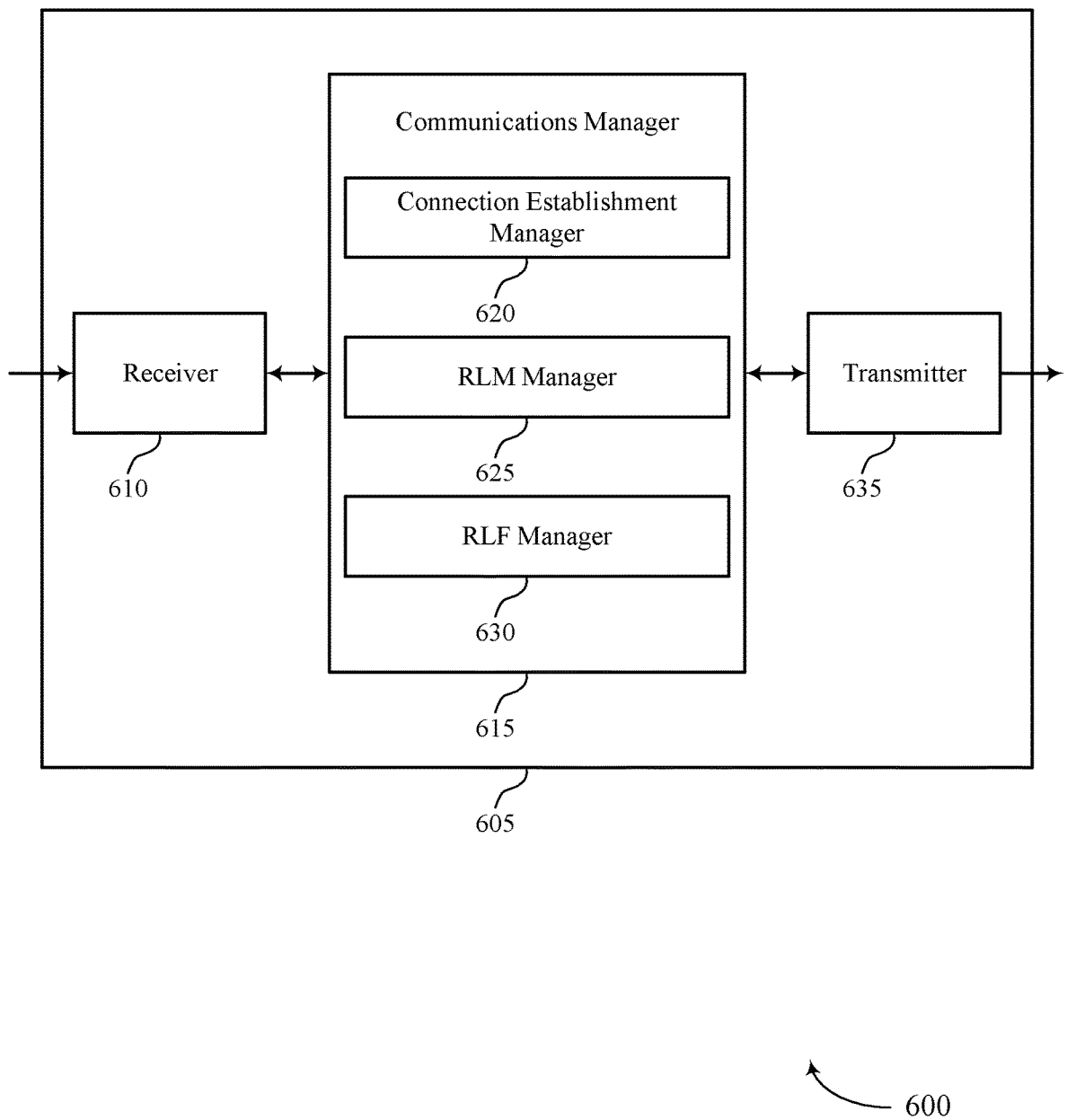

FIG. 6 shows a block diagram 600 of a device 605 that supports beam failure recovery assistance in upper band millimeter wave wireless communications in accordance with one or more aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to beam failure recovery assistance in upper band millimeter wave wireless communications, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a connection establishment manager 620, a RLM manager 625, and an RLF manager 630. The communications manager 615 may be an example of aspects of the communications manager 810 described herein.

The connection establishment manager 620 may establish an uplink connection with a second wireless device using a first beam and a downlink connection with the second wireless device using a second beam that is different from the first beam.

The RLM manager 625 may initiate a first radio link monitoring process for the first beam on the uplink connection and a second radio link monitoring process for the second beam on the downlink connection.

The RLF manager 630 may transmit a radio link failure indication to the second wireless device based on a radio link failure, where the radio link failure is based on one or more of the first radio link monitoring process or the second radio link monitoring process.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
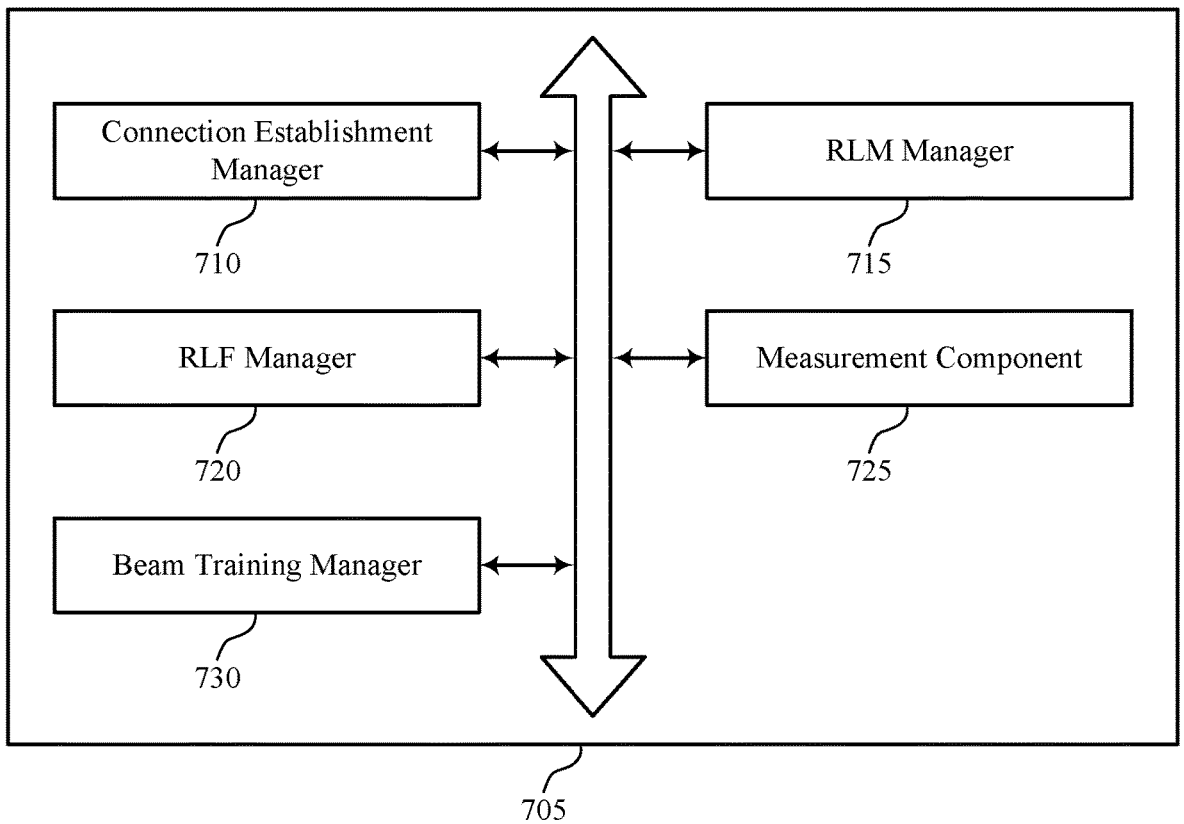
FIG. 7 shows a block diagram of a communications manager that supports beam failure recovery assistance in upper band millimeter wave wireless communications in accordance with one or more aspects of the present disclosure.

FIG. 7 shows a block diagram 700 of a communications manager 705 that supports beam failure recovery assistance in upper band millimeter wave wireless communications in accordance with one or more aspects of the present disclosure. The communications manager 705 may be an example of aspects of a communications manager 515, a communications manager 615, or a communications manager 810 described herein. The communications manager 705 may include a connection establishment manager 710, a RLM manager 715, an RLF manager 720, a measurement component 725, and a beam training manager 730. Each of these modules may communicate, directly or indirectly, with one another (e.g., via one or more buses).

The connection establishment manager 710 may establish an uplink connection with a second wireless device using a first beam and a downlink connection with the second wireless device using a second beam that is different from the first beam. In some cases, one or more of the first beam or the second beam use a millimeter wave frequency band that includes frequencies that are greater than 24.25 GHz. In some cases, the first wireless device is a UE, a base station, a CPE, a relay device, a router, a repeater, or an IAB node, and the second wireless device is a UE, a base station, a CPE, a relay device, a router, a repeater, or an IAB node.

The RLM manager 715 may initiate a first radio link monitoring process for the first beam on the uplink connection and a second radio link monitoring process for the second beam on the downlink connection. In some cases, the first radio link monitoring process is independent of the second radio link monitoring process.

The RLF manager 720 may transmit a radio link failure indication to the second wireless device based on a radio link failure, where the radio link failure is based on one or more of the first radio link monitoring process or the second radio link monitoring process.

In some examples, the RLF manager 720 may determine that a triggering event has occurred based on one or more counters associated with one or more beam quality thresholds. In some examples, the RLF manager 720 may transmit the radio link failure indication responsive to an occurrence of the triggering event.

In some examples, the RLF manager 720 may report an indication of whether a metric associated with the second beam has dropped below a threshold value for use in a beam recovery procedure based on one or more indications that the metric associated with the second beam has dropped below the threshold value. In some cases, the radio link failure indication for the second beam is reported as a downlink control channel failure and is transmitted to the second wireless device using the first beam. In some cases, the radio link failure indication provides one or more candidate beams for a beam training procedure.

The measurement component 725 may measure an associated metric of the first beam or the second beam including at least one of an RSRP, an RSRQ, a SNR, an SINR, or an RSSI, for the one or more reference signals associated with the first beam or the second beam. In some examples, the measurement component 725 may determine that the associated metric for the one or more reference signals has dropped below a threshold value on at least a configured number of occasions. In some cases, one or more of the threshold value of the associated metric or the configured number of occasions, is different for the first beam and the second beam.

In some examples, the measurement component 725 may measure one or more reference signals from one or more training beams received from the second wireless device.

The beam training manager 730 may receive, from the second wireless device responsive to the radio link failure indication, a beam training indication that provides a resource and beam information for the beam training procedure. In some examples, the beam training manager 730 may initiate the beam training procedure responsive to the beam training indication. In some examples, the beam training manager 730 may transmit a measurement report to the second wireless device based on the measuring.

Figure 8:
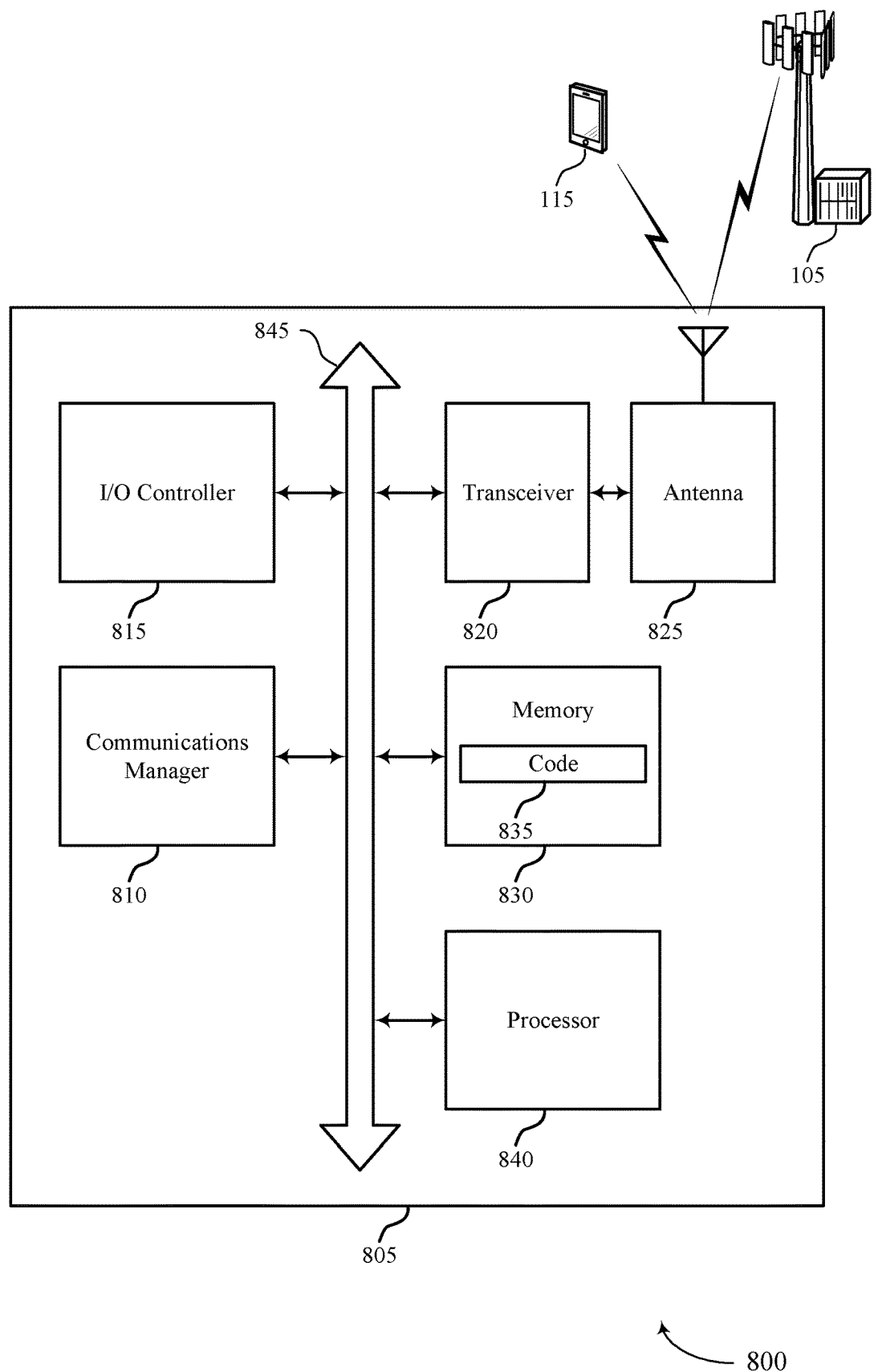
FIG. 8 shows a diagram of a system including a device that supports beam failure recovery assistance in upper band millimeter wave wireless communications in accordance with one or more aspects of the present disclosure.

FIG. 8 shows a diagram of a system 800 including a device 805 that supports beam failure recovery assistance in upper band millimeter wave wireless communications in accordance with one or more aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may establish an uplink connection with a second wireless device using a first beam and a downlink connection with the second wireless device using a second beam that is different from the first beam, initiate a first radio link monitoring process for the first beam on the uplink connection and a second radio link monitoring process for the second beam on the downlink connection, and transmit a radio link failure indication to the second wireless device based on a radio link failure, where the radio link failure is based on one or more of the first radio link monitoring process or the second radio link monitoring process.

The communications manager 810 may as described herein be implemented to realize one or more potential advantages. One implementation may allow the device 805 to maintain separate RLM processes for transmit and receive beams and to indicate RLF separately for each beam, which may allow for efficient indications of RLF and establishment of updated beams for beams that have experienced RLF. Further, implementations may allow the device 805 to have additional flexibility for power management, thermal management, or MPE management when using beamformed communications, among other advantages.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver.

The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic (I/O) system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting beam failure recovery assistance in upper band millimeter wave wireless communications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
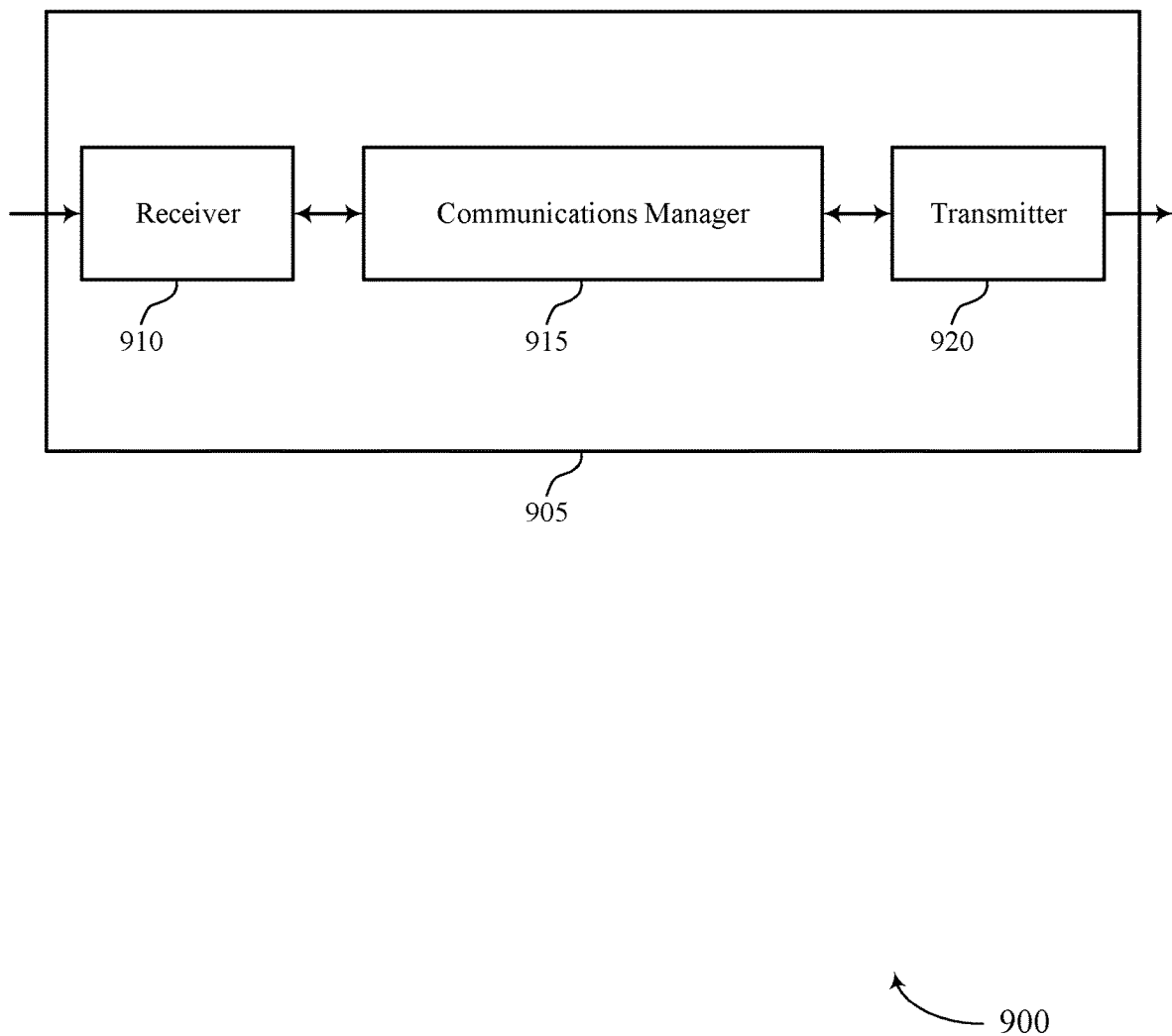
FIGS. 9 and 10 show block diagrams of devices that support beam failure recovery assistance in upper band millimeter wave wireless communications in accordance with one or more aspects of the present disclosure.

FIG. 9 shows a block diagram 900 of a device 905 that supports beam failure recovery assistance in upper band millimeter wave wireless communications in accordance with one or more aspects of the present disclosure. The device 905 may be an example of aspects of a second wireless device, such as a base station 105, as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to beam failure recovery assistance in upper band millimeter wave wireless communications, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may establish an uplink connection with a first wireless device using a first beam and a downlink connection with the first wireless device using a second beam that is different from the first beam, transmit signaling to the first wireless device that includes one or more radio link monitoring parameters for each of a first radio link monitoring process associated with the first beam and a second radio link monitoring process associated with the second beam, where the first radio link monitoring process is different from the second radio link monitoring process, receive a radio link failure indication from the first wireless device indicating that one or more of the first beam or the second beam has a radio link failure, and initiate a beam recovery procedure with the first wireless device responsive to receiving the radio link failure indication. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 915 may be an example of means for performing various aspects of managing beam failure recovery as described herein. The communications manager 915, or its sub-components, may be implemented in hardware (e.g., in communications management circuitry). The circuitry may comprise of processor, DSP, an ASIC, an FPGA or other programmable logic device, discrete gate or transistor logic, discrete hardware components, or any combination thereof designed to perform the functions described in the present disclosure.

In another implementation, the communications manager 915, or its sub-components, may be implemented in code (e.g., as communications management software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device.

In some examples, the communications manager 915 may be configured to perform various operations (e.g., initiating, establishing, transmitting, determining, receiving) using or otherwise in cooperation with the receiver 910, the transmitter 920, or both.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
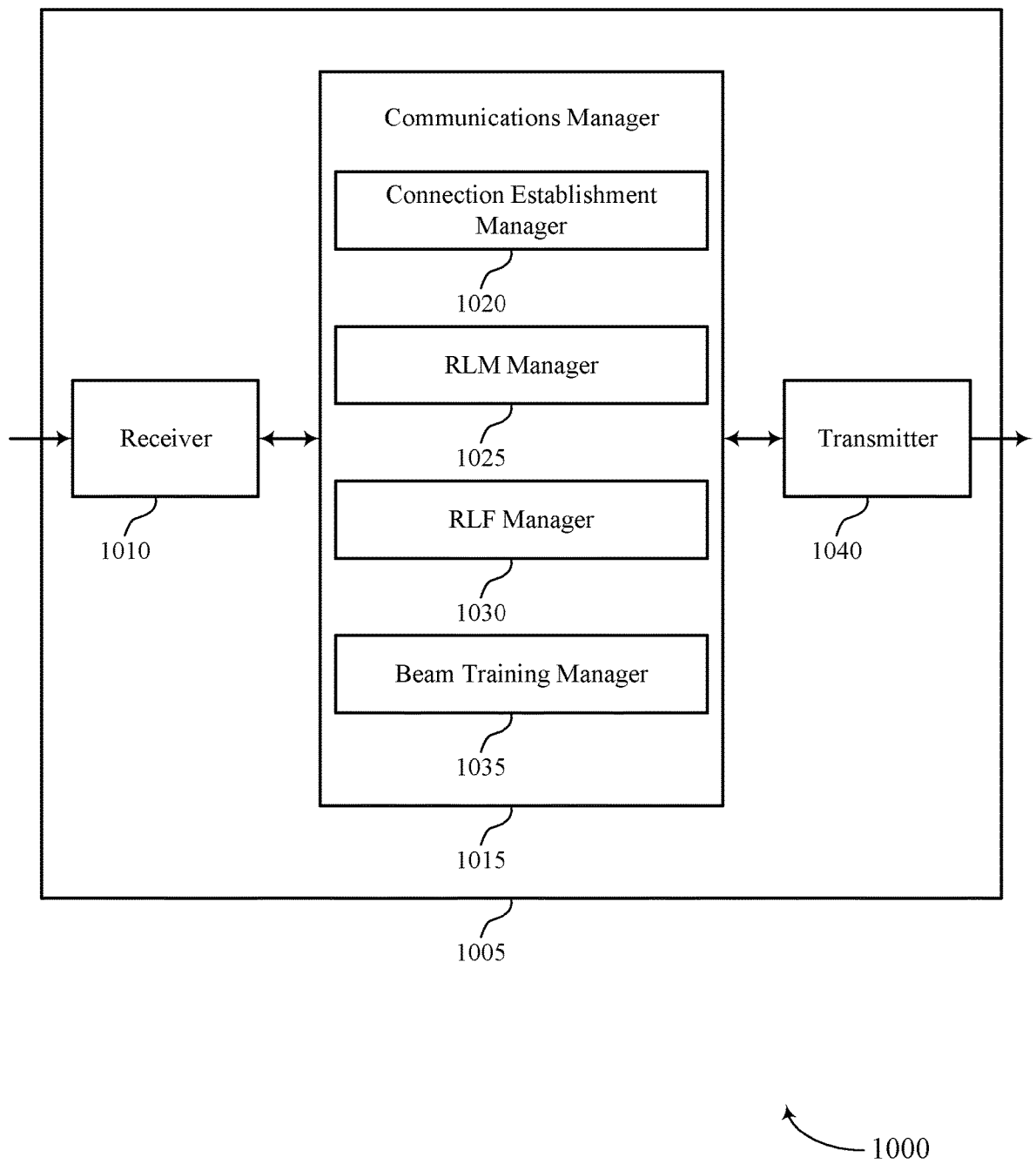

FIG. 10 shows a block diagram 1000 of a device 1005 that supports beam failure recovery assistance in upper band millimeter wave wireless communications in accordance with one or more aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to beam failure recovery assistance in upper band millimeter wave wireless communications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a connection establishment manager 1020, a RLM manager 1025, an RLF manager 1030, and a beam training manager 1035. The communications manager 1015 may be an example of aspects of the communications manager 1210 described herein.

The connection establishment manager 1020 may establish an uplink connection with a first wireless device using a first beam and a downlink connection with the first wireless device using a second beam that is different from the first beam.

The RLM manager 1025 may transmit signaling to the first wireless device that includes one or more radio link monitoring parameters for each of a first radio link monitoring process associated with the first beam and a second radio link monitoring process associated with the second beam, where the first radio link monitoring process is different from the second radio link monitoring process.

The RLF manager 1030 may receive a radio link failure indication from the first wireless device indicating that one or more of the first beam or the second beam has a radio link failure.

The beam training manager 1035 may initiate a beam recovery procedure with the first wireless device responsive to receiving the radio link failure indication.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
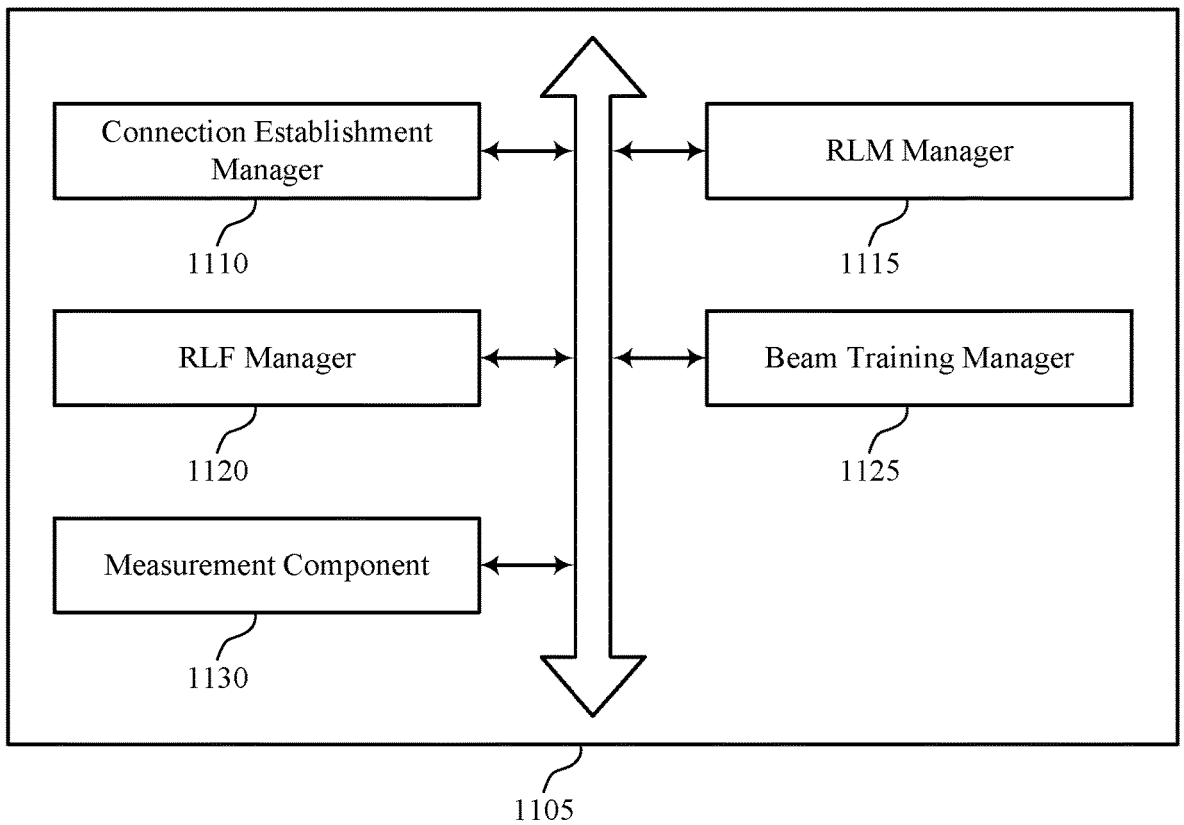
FIG. 11 shows a block diagram of a communications manager that supports beam failure recovery assistance in upper band millimeter wave wireless communications in accordance with one or more aspects of the present disclosure.

FIG. 11 shows a block diagram 1100 of a communications manager 1105 that supports beam failure recovery assistance in upper band millimeter wave wireless communications in accordance with one or more aspects of the present disclosure. The communications manager 1105 may be an example of aspects of a communications manager 915, a communications manager 1015, or a communications manager 1210 described herein. The communications manager 1105 may include a connection establishment manager 1110, a RLM manager 1115, an RLF manager 1120, a beam training manager 1125, and a measurement component 1130. Each of these modules may communicate, directly or indirectly, with one another (e.g., via one or more buses).

The connection establishment manager 1110 may establish an uplink connection with a first wireless device using a first beam and a downlink connection with the first wireless device using a second beam that is different from the first beam. In some cases, one or more of the first beam or the second beam use a millimeter wave frequency band that includes frequencies that are greater than 24.25 GHz. In some cases, the first wireless device is a UE, a base station, a CPE, a relay device, a router, a repeater, or an IAB node, and the second wireless device is a UE, a base station, a CPE, a relay device, a router, a repeater, or an IAB node.

The RLM manager 1115 may transmit signaling to the first wireless device with one or more radio link monitoring parameters for each of a first radio link monitoring process associated with the first beam and a second radio link monitoring process associated with the second beam, where the first radio link monitoring process is different from the second radio link monitoring process. In some cases, the first radio link monitoring process is independent of the second radio link monitoring process.

The RLF manager 1120 may receive a radio link failure indication from the first wireless device indicating that one or more of the first beam or the second beam has a radio link failure.

In some examples, the RLF manager 1120 may receive two or more indications of whether a reference signal received power associated with the second beam is above or below a threshold value. In some examples, the RLF manager 1120 may determine to initiate the beam recovery procedure based on the two or more indications showing that the reference signal received power associated with the second beam has dropped below the threshold value. In some cases, the one or more radio link monitoring parameters include one or more threshold values for a reference signal received power associated with one or more of the first beam or the second beam, a number of occasions of reference signal received power dropping below the one or more threshold values, or any combinations thereof. In some cases, one or more of the threshold values or the number of occasions is different for the first beam and the second beam. In some cases, the radio link failure indication for the second beam is reported as a downlink control channel failure and is received from the first wireless device via the first beam.

The beam training manager 1125 may initiate a beam recovery procedure with the first wireless device responsive to receiving the radio link failure indication. In some examples, the beam training manager 1125 may transmit a beam training indication to the first wireless device that provides a resource and beam information for the beam training procedure. In some examples, the beam training manager 1125 may initiate the beam training procedure responsive to the beam training indication. In some examples, the beam training manager 1125 may transmit one or more training beams to the first wireless device. In some cases, the radio link failure indication provides one or more candidate beams for a beam training procedure.

The measurement component 1130 may receive a measurement report from the first wireless device that indicates one or more measurements associated with the one or more training beams.

Figure 12:
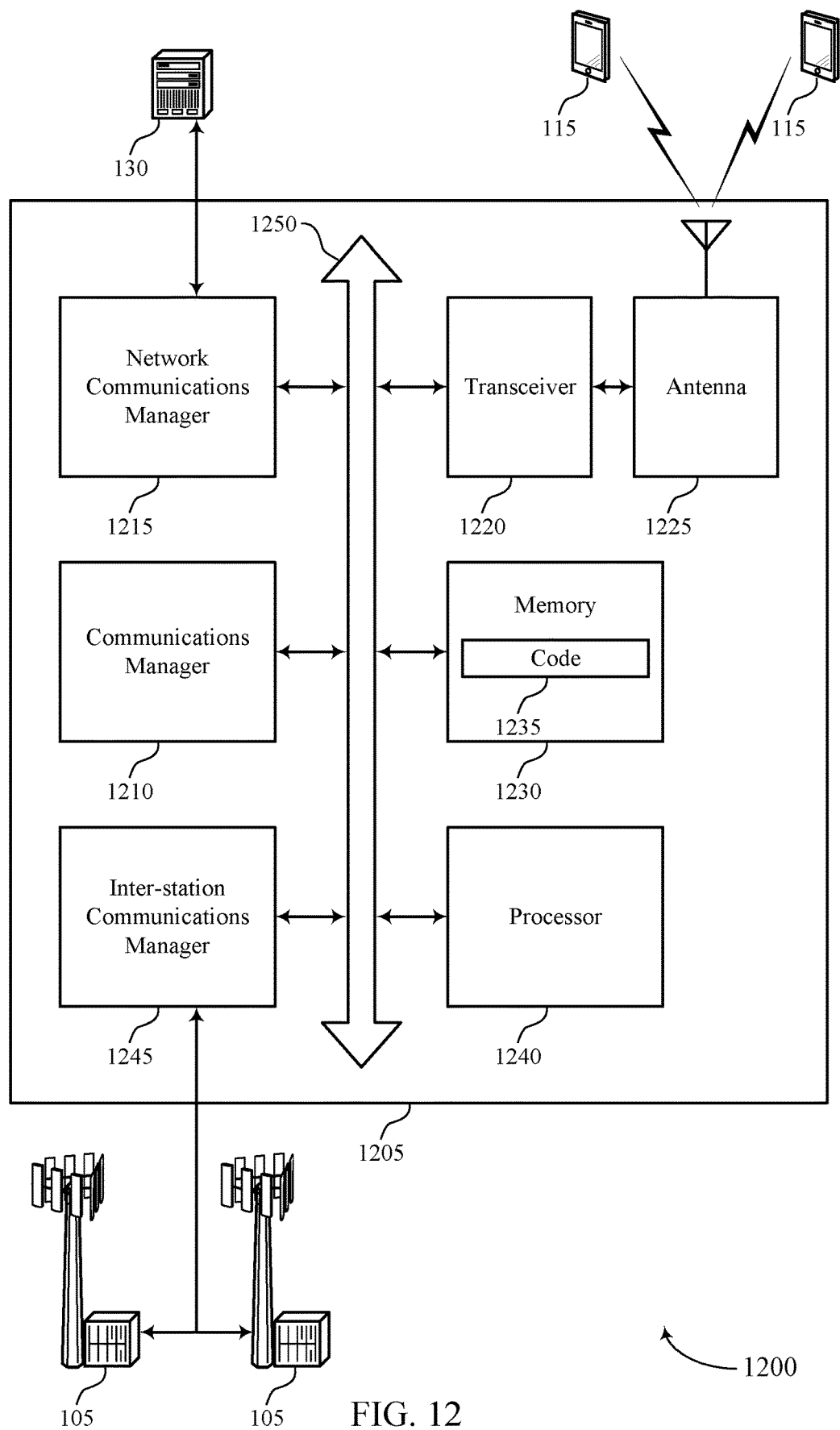
FIG. 12 shows a diagram of a system including a device that supports beam failure recovery assistance in upper band millimeter wave wireless communications in accordance with one or more aspects of the present disclosure.

FIG. 12 shows a diagram of a system 1200 including a device 1205 that supports beam failure recovery assistance in upper band millimeter wave wireless communications in accordance with one or more aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may establish an uplink connection with a first wireless device using a first beam and a downlink connection with the first wireless device using a second beam that is different from the first beam, transmit signaling to the first wireless device that includes one or more radio link monitoring parameters for each of a first radio link monitoring process associated with the first beam and a second radio link monitoring process associated with the second beam, where the first radio link monitoring process is different from the second radio link monitoring process, receive a radio link failure indication from the first wireless device indicating that one or more of the first beam or the second beam has a radio link failure, and initiate a beam recovery procedure with the first wireless device responsive to receiving the radio link failure indication.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting beam failure recovery assistance in upper band millimeter wave wireless communications).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
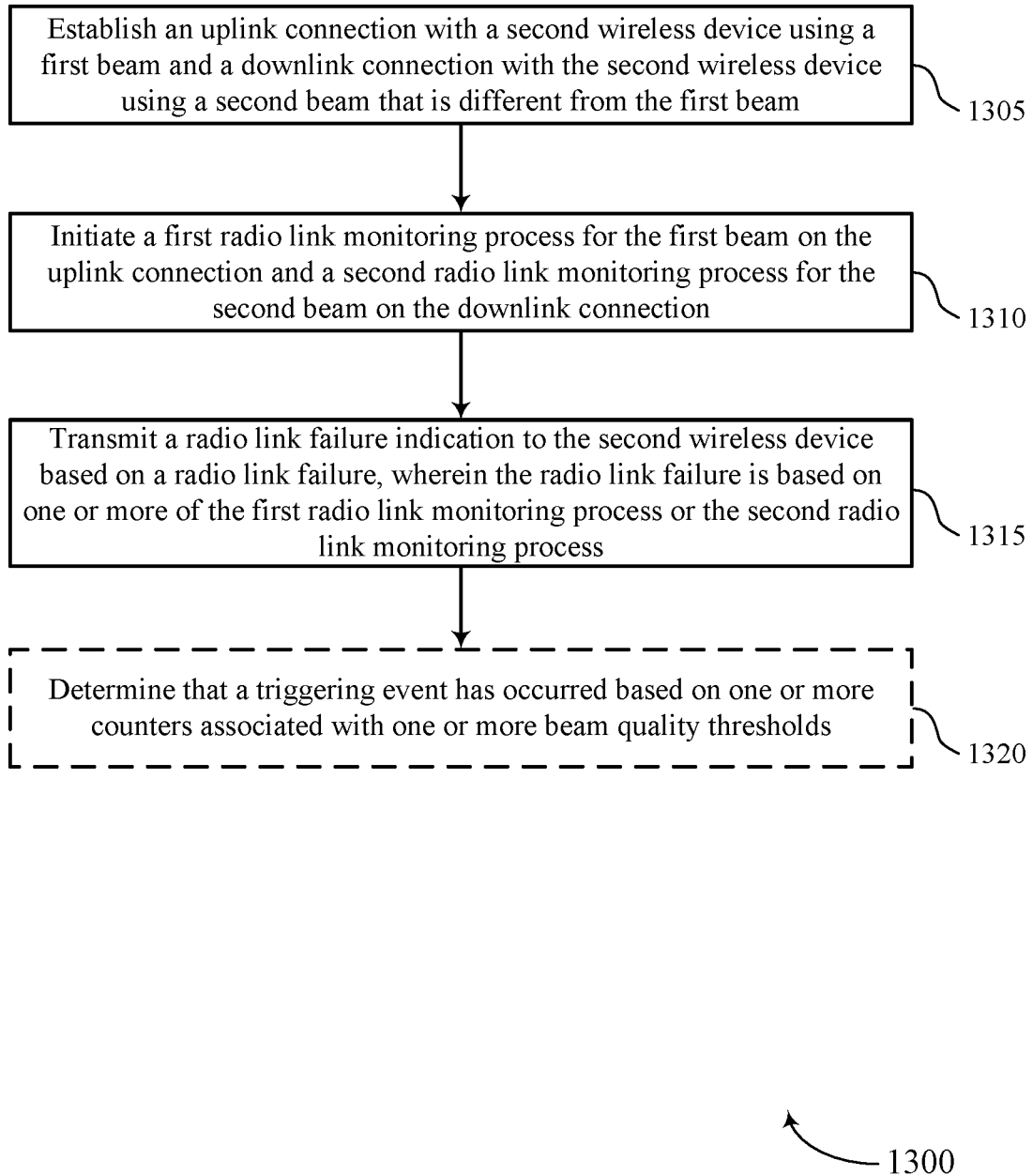
FIGS. 13 through 17 show flowcharts illustrating methods that support beam failure recovery assistance in upper band millimeter wave wireless communications in accordance with one or more aspects of the present disclosure.

FIG. 13 shows a flowchart illustrating a method 1300 that supports beam failure recovery assistance in upper band millimeter wave wireless communications in accordance with one or more aspects of the present disclosure. The operations of method 1300 may be implemented by a first wireless device, such as UE 115, or its components as described herein. For example, the operations of method 1300 may be performed by a communications manager as described with reference to FIGS. 5 through 8. In some examples, a first wireless device may execute a set of instructions to control the functional elements of the first wireless device to perform the functions described herein. Additionally or alternatively, a first wireless device may perform aspects of the functions described herein using special-purpose hardware.

At 1305, the first wireless device may establish an uplink connection with a second wireless device using a first beam and a downlink connection with the second wireless device using a second beam that is different from the first beam. The operations of 1305 may be performed according to the methods described herein. In some examples, aspects of the operations of 1305 may be performed by a connection establishment manager as described with reference to FIGS. 5 through 8.

At 1310, the first wireless device may initiate a first radio link monitoring process for the first beam on the uplink connection and a second radio link monitoring process for the second beam on the downlink connection. The operations of 1310 may be performed according to the methods described herein. In some examples, aspects of the operations of 1310 may be performed by a RLM manager as described with reference to FIGS. 5 through 8.

At 1315, the first wireless device may transmit a radio link failure indication to the second wireless device based on a radio link failure, where the radio link failure is based on one or more of the first radio link monitoring process or the second radio link monitoring process. The operations of 1315 may be performed according to the methods described herein. In some examples, aspects of the operations of 1315 may be performed by an RLF manager as described with reference to FIGS. 5 through 8. In some cases, the first wireless device may report an indication of whether a metric associated with the second beam has dropped below a threshold value for use in a beam recovery procedure based on one or more indications that the metric associated with the second beam has dropped below the threshold value. In some cases, the first wireless device may report one or more candidate beams for a subsequent beam training procedure.

At 1320, in some cases, the first wireless device may determine that a triggering event has occurred based on one or more counters associated with one or more beam quality thresholds, where the radio link failure is determined based on a beam quality dropping below a beam quality threshold more than a configured number of times. The operations of 1320 may be performed according to the methods described herein. In some examples, aspects of the operations of 1320 may be performed by an RLF manager as described with reference to FIGS. 5 through 8. In some cases, the beam quality thresholds may be associated with a RSRP, RSSI, RSRQ SNR, SINR, or any combinations thereof.

Figure 14:
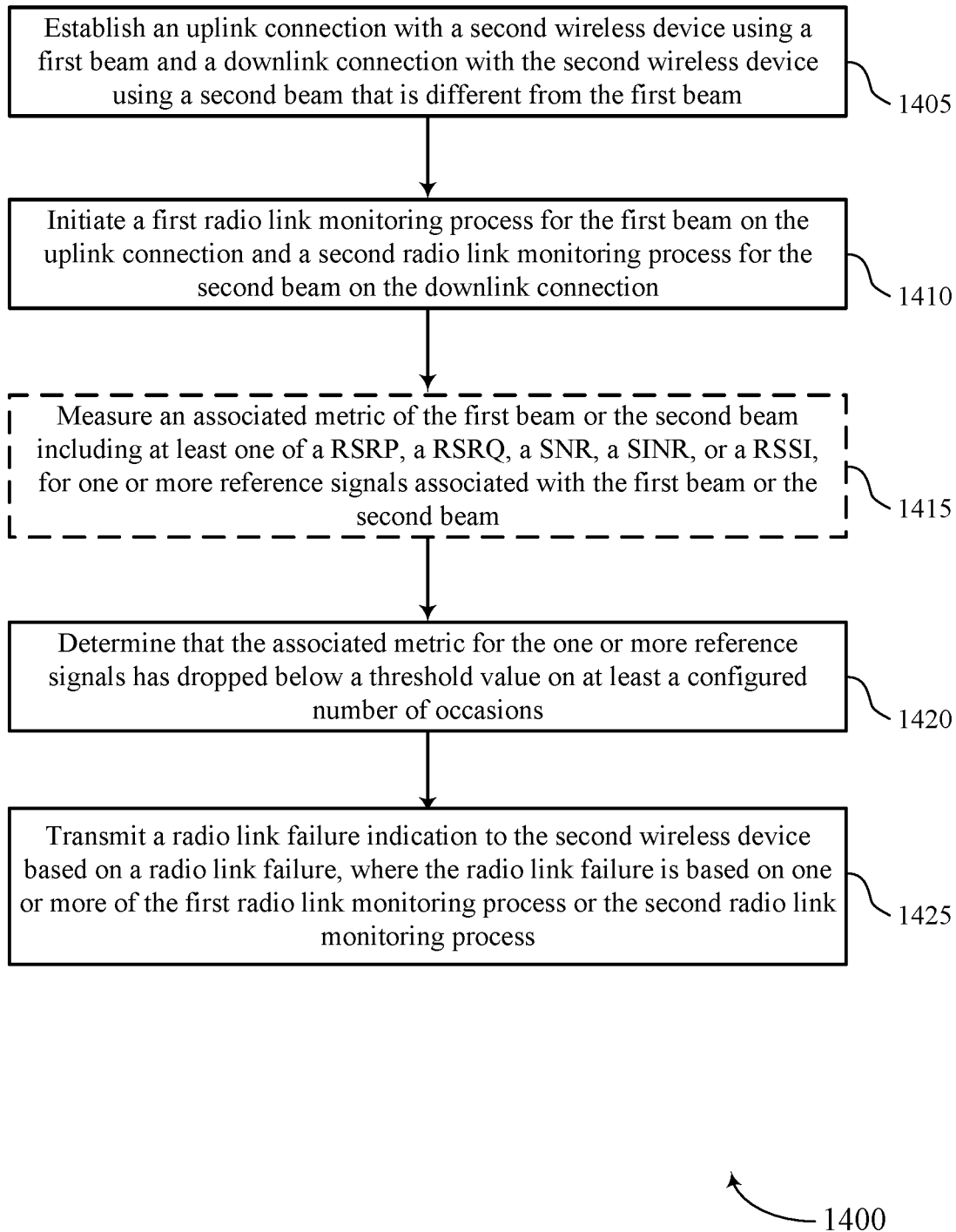

FIG. 14 shows a flowchart illustrating a method 1400 that supports beam failure recovery assistance in upper band millimeter wave wireless communications in accordance with one or more aspects of the present disclosure. The operations of method 1400 may be implemented by a first wireless device, such as a UE 115, or its components as described herein. For example, the operations of method 1400 may be performed by a communications manager as described with reference to FIGS. 5 through 8. In some examples, a first wireless device may execute a set of instructions to control the functional elements of the first wireless device to perform the functions described herein. Additionally or alternatively, a first wireless device may perform aspects of the functions described herein using special-purpose hardware.

At 1405, the first wireless device may establish an uplink connection with a second wireless device using a first beam and a downlink connection with the second wireless device using a second beam that is different from the first beam. The operations of 1405 may be performed according to the methods described herein. In some examples, aspects of the operations of 1405 may be performed by a connection establishment manager as described with reference to FIGS. 5 through 8.

At 1410, the first wireless device may initiate a first radio link monitoring process for the first beam on the uplink connection and a second radio link monitoring process for the second beam on the downlink connection. The operations of 1410 may be performed according to the methods described herein. In some examples, aspects of the operations of 1410 may be performed by a RLM manager as described with reference to FIGS. 5 through 8.

At 1415, in some cases, the first wireless device may measure an associated metric of the first beam or the second beam including at least one of a RSRP, a RSRQ, a SNR, a SINR, or a RSSI, for the one or more reference signals associated with the first beam or the second beam. The operations of 1415 may be performed according to the methods described herein. In some examples, aspects of the operations of 1415 may be performed by a measurement component as described with reference to FIGS. 5 through 8.

At 1420, the first wireless device may determine that the associated metric for the one or more reference signals has dropped below a threshold value on at least a configured number of occasions. The operations of 1420 may be performed according to the methods described herein. In some examples, aspects of the operations of 1420 may be performed by a measurement component as described with reference to FIGS. 5 through 8.

At 1425, the first wireless device may transmit a radio link failure indication to the second wireless device based on a radio link failure, where the radio link failure is based on one or more of the first radio link monitoring process or the second radio link monitoring process. The operations of 1425 may be performed according to the methods described herein. In some examples, aspects of the operations of 1425 may be performed by an RLF manager as described with reference to FIGS. 5 through 8.

Figure 15:
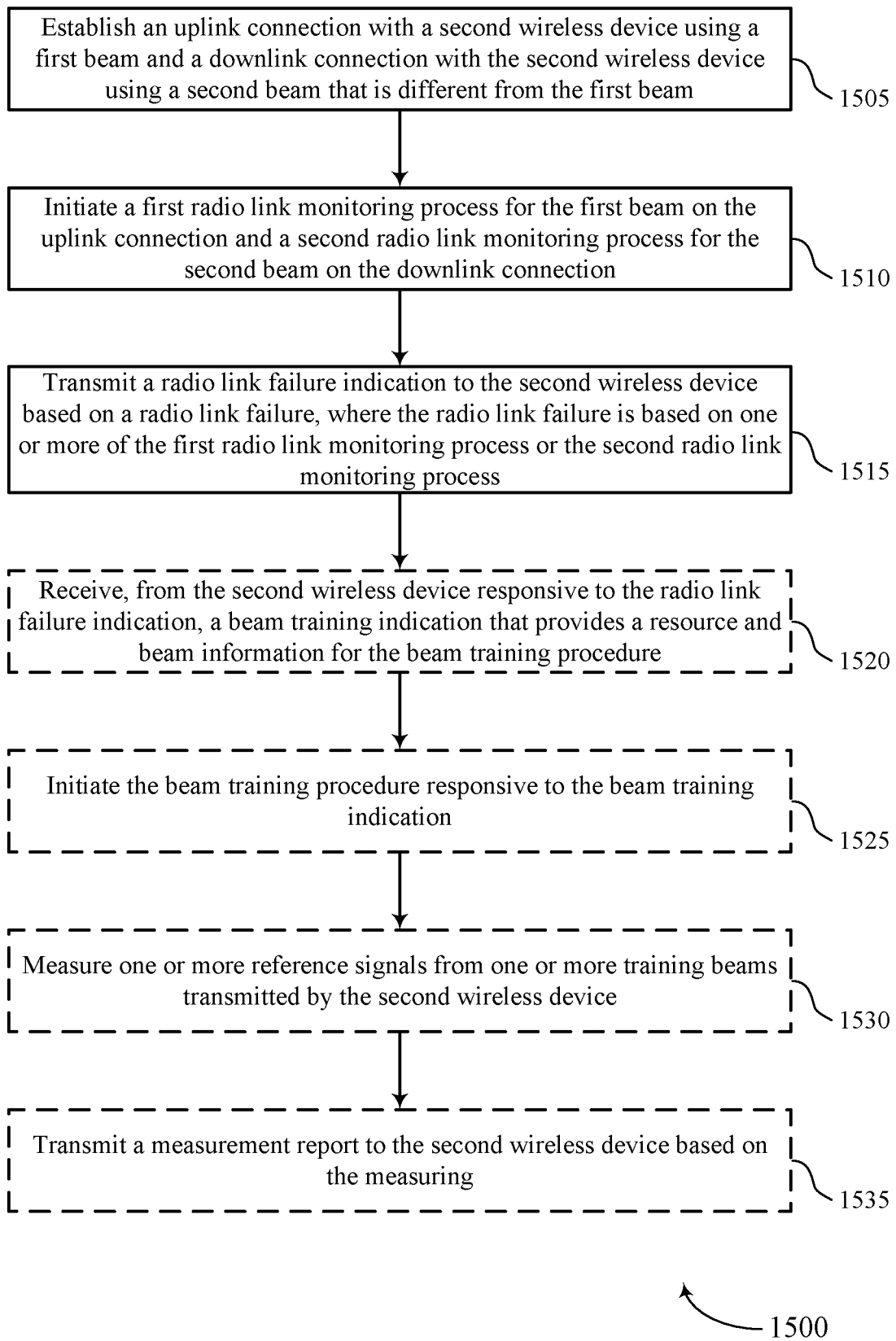

FIG. 15 shows a flowchart illustrating a method 1500 that supports beam failure recovery assistance in upper band millimeter wave wireless communications in accordance with one or more aspects of the present disclosure. The operations of method 1500 may be implemented by a first wireless device, such as a UE 115, or its components as described herein. For example, the operations of method 1500 may be performed by a communications manager as described with reference to FIGS. 5 through 8. In some examples, a first wireless device may execute a set of instructions to control the functional elements of the first wireless device to perform the functions described herein. Additionally or alternatively, a first wireless device may perform aspects of the functions described herein using special-purpose hardware.

At 1505, the first wireless device may establish an uplink connection with a second wireless device using a first beam and a downlink connection with the second wireless device using a second beam that is different from the first beam. The operations of 1505 may be performed according to the methods described herein. In some examples, aspects of the operations of 1505 may be performed by a connection establishment manager as described with reference to FIGS. 5 through 8.

At 1510, the first wireless device may initiate a first radio link monitoring process for the first beam on the uplink connection and a second radio link monitoring process for the second beam on the downlink connection. The operations of 1510 may be performed according to the methods described herein. In some examples, aspects of the operations of 1510 may be performed by a RLM manager as described with reference to FIGS. 5 through 8.

At 1515, the first wireless device may transmit a radio link failure indication to the second wireless device based on a radio link failure, where the radio link failure is based on one or more of the first radio link monitoring process or the second radio link monitoring process. The operations of 1515 may be performed according to the methods described herein. In some examples, aspects of the operations of 1515 may be performed by an RLF manager as described with reference to FIGS. 5 through 8. In some cases, the radio link failure indication provides one or more candidate beams for a beam training procedure.

At 1520, the first wireless device may receive, from the second wireless device responsive to the radio link failure indication, a beam training indication that provides a resource and beam information for the beam training procedure. The operations of 1520 may be performed according to the methods described herein. In some examples, aspects of the operations of 1520 may be performed by a beam training manager as described with reference to FIGS. 5 through 8.

At 1525, the first wireless device may initiate the beam training procedure responsive to the beam training indication. The operations of 1525 may be performed according to the methods described herein. In some examples, aspects of the operations of 1525 may be performed by a beam training manager as described with reference to FIGS. 5 through 8.

At 1530, the first wireless device may measure one or more reference signals from one or more training beams received from the second wireless device. The operations of 1530 may be performed according to the methods described herein. In some examples, aspects of the operations of 1530 may be performed by a measurement component as described with reference to FIGS. 5 through 8.

At 1535, the first wireless device may transmit a measurement report to the second wireless device based on the measuring. The operations of 1535 may be performed according to the methods described herein. In some examples, aspects of the operations of 1535 may be performed by a beam training manager as described with reference to FIGS. 5 through 8.

Figure 16:
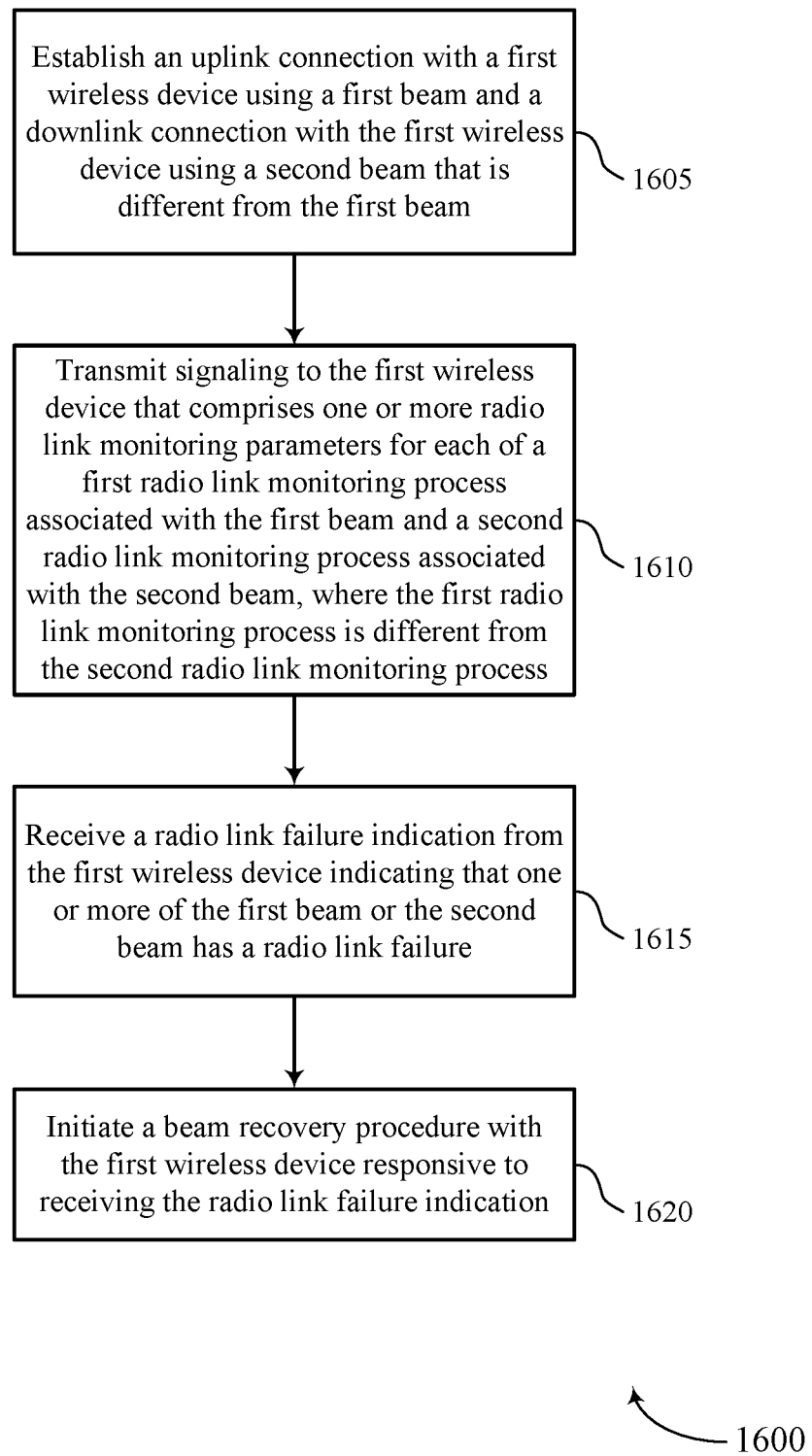

FIG. 16 shows a flowchart illustrating a method 1600 that supports beam failure recovery assistance in upper band millimeter wave wireless communications in accordance with one or more aspects of the present disclosure. The operations of method 1600 may be implemented by a second wireless device, such as a base station 105, or its components as described herein. For example, the operations of method 1600 may be performed by a communications manager as described with reference to FIGS. 9 through 12. In some examples, a second wireless device may execute a set of instructions to control the functional elements of the second wireless device to perform the functions described herein. Additionally or alternatively, a second wireless device may perform aspects of the functions described herein using special-purpose hardware.

At 1605, the second wireless device may establish an uplink connection with a first wireless device using a first beam and a downlink connection with the first wireless device using a second beam that is different from the first beam. The operations of 1605 may be performed according to the methods described herein. In some examples, aspects of the operations of 1605 may be performed by a connection establishment manager as described with reference to FIGS. 9 through 12.

At 1610, the second wireless device may transmit signaling to the first wireless device that includes one or more radio link monitoring parameters for each of a first radio link monitoring process associated with the first beam and a second radio link monitoring process associated with the second beam, where the first radio link monitoring process is different from the second radio link monitoring process. The operations of 1610 may be performed according to the methods described herein. In some examples, aspects of the operations of 1610 may be performed by a RLM manager as described with reference to FIGS. 9 through 12.

At 1615, the second wireless device may receive a radio link failure indication from the first wireless device indicating that one or more of the first beam or the second beam has a radio link failure. The operations of 1615 may be performed according to the methods described herein. In some examples, aspects of the operations of 1615 may be performed by an RLF manager as described with reference to FIGS. 9 through 12.

At 1620, the second wireless device may initiate a beam recovery procedure with the first wireless device responsive to receiving the radio link failure indication. The operations of 1620 may be performed according to the methods described herein. In some examples, aspects of the operations of 1620 may be performed by a beam training manager as described with reference to FIGS. 9 through 12.

Figure 17:
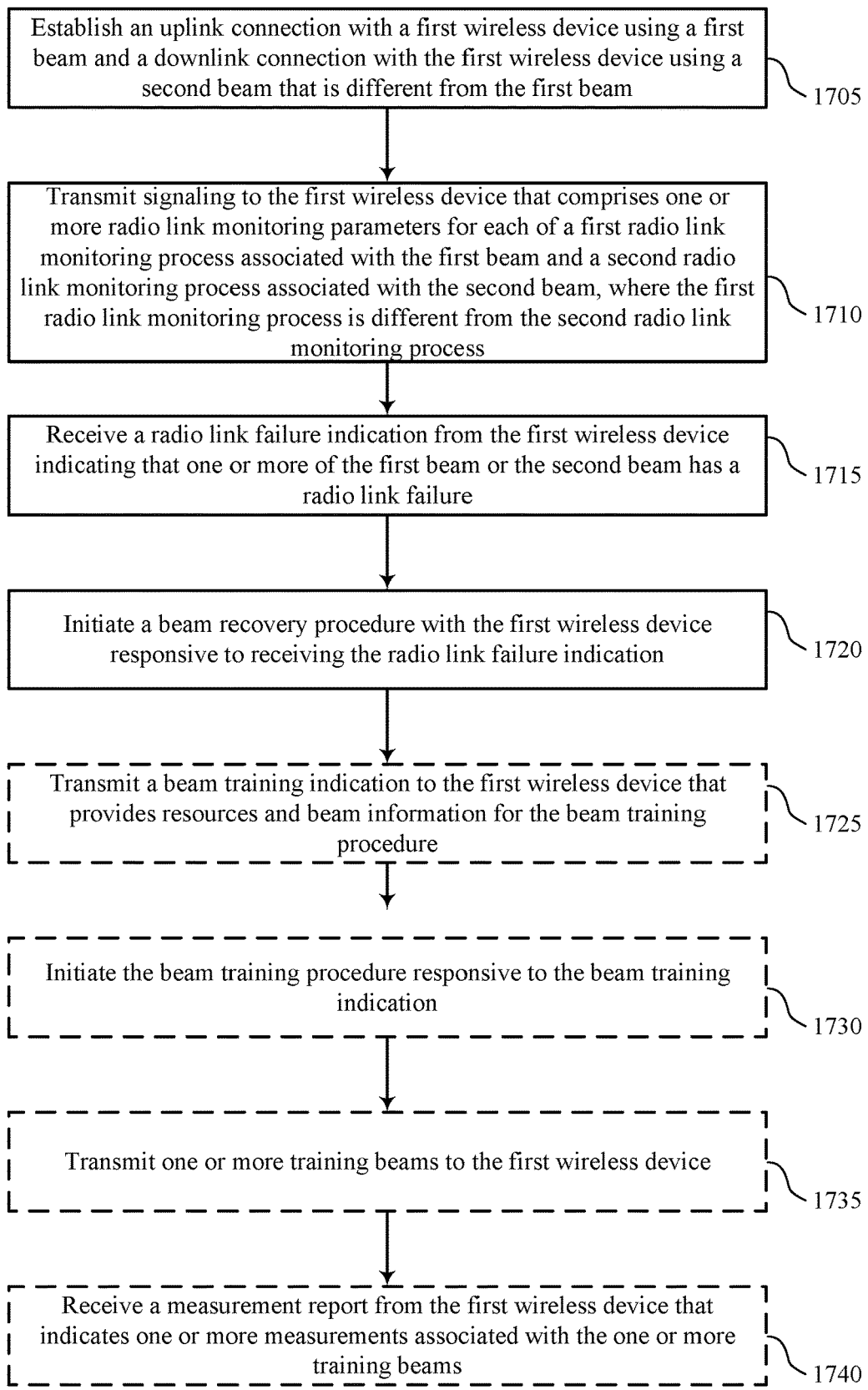

FIG. 17 shows a flowchart illustrating a method 1700 that supports beam failure recovery assistance in upper band millimeter wave wireless communications in accordance with one or more aspects of the present disclosure. The operations of method 1700 may be implemented by a second wireless devices, such as a base station 105, or its components as described herein. For example, the operations of method 1700 may be performed by a communications manager as described with reference to FIGS. 9 through 12. In some examples, a second wireless device may execute a set of instructions to control the functional elements of the second wireless device to perform the functions described herein. Additionally or alternatively, a second wireless device may perform aspects of the functions described herein using special-purpose hardware.

At 1705, the second wireless device may establish an uplink connection with a first wireless device using a first beam and a downlink connection with the first wireless device using a second beam that is different from the first beam. The operations of 1705 may be performed according to the methods described herein. In some examples, aspects of the operations of 1705 may be performed by a connection establishment manager as described with reference to FIGS. 9 through 12.

At 1710, the second wireless device may transmit signaling to the first wireless device with one or more radio link monitoring parameters for each of a first radio link monitoring process associated with the first beam and a second radio link monitoring process associated with the second beam, where the first radio link monitoring process is different from the second radio link monitoring process. The operations of 1710 may be performed according to the methods described herein. In some examples, aspects of the operations of 1710 may be performed by a RLM manager as described with reference to FIGS. 9 through 12.

At 1715, the second wireless device may receive a radio link failure indication from the first wireless device indicating that one or more of the first beam or the second beam has a radio link failure. The operations of 1715 may be performed according to the methods described herein. In some examples, aspects of the operations of 1715 may be performed by an RLF manager as described with reference to FIGS. 9 through 12. In some cases, the radio link failure indication provides one or more candidate beams for a beam training procedure.

At 1720, the second wireless device may initiate a beam recovery procedure with the first wireless device responsive to receiving the radio link failure indication. The operations of 1720 may be performed according to the methods described herein. In some examples, aspects of the operations of 1720 may be performed by a beam training manager as described with reference to FIGS. 9 through 12.

At 1725, the second wireless device may transmit a beam training indication to the first wireless device that provides a resource and beam information for the beam training procedure. The operations of 1725 may be performed according to the methods described herein. In some examples, aspects of the operations of 1725 may be performed by a beam training manager as described with reference to FIGS. 9 through 12.

At 1730, the second wireless device may initiate the beam training procedure responsive to the beam training indication. The operations of 1730 may be performed according to the methods described herein. In some examples, aspects of the operations of 1730 may be performed by a beam training manager as described with reference to FIGS. 9 through 12.

At 1735, the second wireless device may transmit one or more training beams to the first wireless device. The operations of 1735 may be performed according to the methods described herein. In some examples, aspects of the operations of 1735 may be performed by a beam training manager as described with reference to FIGS. 9 through 12.

At 1740, the second wireless device may receive a measurement report from the first wireless device that indicates one or more measurements associated with the one or more training beams. The operations of 1740 may be performed according to the methods described herein. In some examples, aspects of the operations of 1740 may be performed by a measurement component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Aspect 1: A method for wireless communications at a first wireless device, comprising: establishing an uplink connection with a second wireless device using a first beam and a downlink connection with the second wireless device using a second beam that is different from the first beam; initiating a first radio link monitoring process for the first beam on the uplink connection and a second radio link monitoring process for the second beam on the downlink connection; and transmitting a radio link failure indication to the second wireless device based at least in part on a radio link failure, where the radio link failure is based at least in part on one or more of the first radio link monitoring process or the second radio link monitoring process.

Aspect 2: The method of aspect 1, wherein the first radio link monitoring process is independent of the second radio link monitoring process.

Aspect 3: The method of any of aspects 1 or 2, wherein one or more of the first radio link monitoring process or the second radio link monitoring process comprises: measuring an associated metric of the first beam or the second beam for one or more reference signals associated with the first beam or the second beam; and determining that the associated metric for the one or more reference signals has dropped below a threshold value on at least a configured number of occasions.

Aspect 4: The method of aspect 3, wherein the associated metric of the first beam or the second beam includes at least one of an RSRP, an RSRQ, an SNR, an SINR, an RSSI, or any combinations thereof.

Aspect 5: The method of aspect 3, wherein one or more of the threshold value of the associated metric or the configured number of occasions, is different for the first beam and the second beam.

Aspect 6: The method of any of aspects 1 to 5, wherein the radio link failure indication for the second beam is reported as a downlink control channel failure and is transmitted to the second wireless device using the first beam.

Aspect 7: The method of any of aspects 1 to 6, wherein the radio link failure indication provides one or more candidate beams for a beam training procedure.

Aspect 8: The method of aspect 7, further comprising: receiving, from the second wireless device responsive to the radio link failure indication, a beam training indication that provides a resource and beam information for the beam training procedure; and initiating the beam training procedure responsive to the beam training indication.

Aspect 9: The method of aspect 8, further comprising: measuring one or more reference signals from one or more training beams received from the second wireless device; and transmitting a measurement report to the second wireless device based at least in part on the measuring.

Aspect 10: The method of any of aspects 1 to 9, wherein the transmitting the radio link failure indication comprises: determining that a triggering event has occurred based on one or more counters associated with one or more beam quality thresholds; and transmitting the radio link failure indication responsive to an occurrence of the triggering event.

Aspect 11: The method of any of aspects 1 to 10, wherein the transmitting the radio link failure indication comprises: reporting an indication of whether a metric associated with the second beam has dropped below a threshold value for use in a beam recovery procedure based on one or more indications that the metric associated with the second beam has dropped below the threshold value.

Aspect 12: The method of any of aspects 1 to 11, wherein one or more of the first beam or the second beam use a millimeter wave frequency band that includes frequencies that are greater than 24.25 GHz.

Aspect 13: The method of any of aspects 1 to 12, wherein the first wireless device is a UE, a base station, a CPE, a relay device, a router, a repeater, or an IAB node, and the second wireless device is a UE, a base station, a CPE, a relay device, a router, a repeater, or an IAB node.

Aspect 14: An apparatus comprising at least one means for performing a method of any of aspects 1 to 13.

Aspect 15: An apparatus for wireless communications comprising a processor; and memory coupled to the processor, the processor and memory configured to perform a method of any of aspects 1 to 13.

Aspect 16: A non-transitory computer-readable medium storing code for wireless communications, the code comprising instructions executable by a processor to perform a method of any of aspects 1 to 13.

Aspect 17: A method for wireless communications at a second wireless device, comprising: establishing an uplink connection with a first wireless device using a first beam and a downlink connection with the first wireless device using a second beam that is different from the first beam; transmit signaling to the first wireless device that comprises one or more radio link monitoring parameters for each of a first radio link monitoring process associated with the first beam and a second radio link monitoring process associated with the second beam, wherein the first radio link monitoring process is different from the second radio link monitoring process; receiving a radio link failure indication from the first wireless device indicating that one or more of the first beam or the second beam has a radio link failure; and initiating a beam recovery procedure with the first wireless device responsive to receiving the radio link failure indication.

Aspect 18: The method of aspect 17, wherein the first radio link monitoring process is independent of the second radio link monitoring process.

Aspect 19: The method of any of aspects 17 to 18, wherein the one or more radio link monitoring parameters include one or more threshold values for a reference signal received power associated with one or more of the first beam or the second beam, a number of occasions of reference signal received power dropping below the one or more threshold values, or any combinations thereof.

Aspect 20: The method of aspect 19, wherein one or more of the one or more threshold values or the number of occasions is different for the first beam and the second beam.

Aspect 21: The method of any of aspects 17 to 20, wherein the radio link failure indication for the second beam is reported as a downlink control channel failure and is received from the first wireless device via the uplink connection.

Aspect 22: The method of any of aspects 17 to 21, wherein the radio link failure indication provides one or more candidate beams for a beam training procedure.

Aspect 23: The method of aspect 22, wherein the initiating the beam recovery procedure comprises: transmitting a beam training indication to the first wireless device that provides a resource and beam information for the beam training procedure; and initiating the beam training procedure responsive to the beam training indication.

Aspect 24: The method of aspect 23, further comprising: transmitting one or more training beams to the first wireless device; and receiving a measurement report from the first wireless device that indicates one or more measurements associated with the one or more training beams.

Aspect 25: The method of any of aspects 17 to 24, wherein the receiving the radio link failure indication comprises: receiving two or more indications of whether a reference signal received power associated with the second beam is above or below a threshold value; and determining to initiate the beam recovery procedure based at least in part on the two or more indications showing that the reference signal received power associated with the second beam has dropped below the threshold value.

Aspect 26: The method of any of aspects 17 to 25, wherein one or more of the first beam or the second beam use a millimeter wave frequency band that includes frequencies that are greater than 24.25 GHz.

Aspect 27: The method of any of aspects 17 to 26, wherein the first wireless device is a UE, a base station, a CPE, a relay device, a router, a repeater, or an IAB node, and the second wireless device is a UE, a base station, a CPE, a relay device, a router, a repeater, or an IAB node.

Aspect 27: An apparatus comprising at least one means for performing a method of any of aspects 17 to 27.

Aspect 28: An apparatus for wireless communications comprising a processor; and memory coupled to the processor, the processor and memory configured to perform a method of any of aspects 17 to 27.

Aspect 29: A non-transitory computer-readable medium storing code for wireless communications, the code comprising instructions executable by a processor to perform a method of any of aspects 17 to 27.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first wireless device, comprising:
   establishing an uplink connection with a second wireless device using a first beam and a downlink connection with the second wireless device using a second beam that is different from the first beam;
   initiating a first radio link monitoring process for the first beam on the uplink connection, wherein the first radio link monitoring process is associated with a first set of one or more radio link monitoring parameters;
   initiating, based at least in part on initiating the first radio link monitoring process, a second radio link monitoring process for the second beam on the downlink connection, wherein the second radio link monitoring process is associated with a second set of one or more radio link monitoring parameters different from the first set of one or more radio link monitoring parameters;
   selecting one or more candidate beams associated with a first beam characteristic that is a same as a second beam characteristic associated with the second beam; and
   transmitting, to the second wireless device based at least in part on a radio link failure, a radio link failure indication comprising an indication of the one or more candidate beams, wherein the radio link failure is based at least in part on the second radio link monitoring process.

2. The method of claim 1, wherein the first radio link monitoring process is independent of the second radio link monitoring process.

3. The method of claim 1, wherein one or more of the first radio link monitoring process and the second radio link monitoring process comprise:
   measuring an associated metric of the first beam or the second beam for one or more reference signals associated with the first beam or the second beam; and
   determining that the associated metric for the one or more reference signals has dropped below a threshold value on at least a configured quantity of occasions.

4. The method of claim 3, wherein:
   the associated metric of the first beam or the second beam includes at least one of a reference signal received power (RSRP), a reference signal received quality (RSRQ), a signal-to-noise ratio (SNR), a signal-to-interference and noise ratio (SINR), a reference signal strength indicator (RSSI), or any combinations thereof, for the one or more reference signals associated with the first beam or the second beam.

5. The method of claim 3, wherein one or more of the threshold value of the associated metric and the configured quantity of occasions, are different for the first beam and the second beam.

6. The method of claim 1, wherein the radio link failure indication for the second beam is reported as a downlink control channel failure and is transmitted to the second wireless device using the first beam.

7. The method of claim 1, wherein the radio link failure indication provides the one or more candidate beams for a beam training procedure.

8. The method of claim 7, further comprising:
   receiving, from the second wireless device responsive to the radio link failure indication, a beam training indication that provides a resource and beam information for the beam training procedure; and
   initiating the beam training procedure responsive to the beam training indication.

9. The method of claim 8, further comprising:
   measuring one or more reference signals from one or more training beams received from the second wireless device; and
   transmitting a measurement report to the second wireless device based at least in part on the measuring.

10. The method of claim 1, wherein the transmitting the radio link failure indication comprises:
    determining that a triggering event has occurred based on one or more counters associated with one or more beam quality thresholds; and
    transmitting the radio link failure indication responsive to an occurrence of the triggering event.

11. The method of claim 1, wherein the transmitting the radio link failure indication comprises:
    reporting an indication of whether a metric associated with the second beam has dropped below a threshold value for use in a beam recovery procedure based on one or more indications that the metric associated with the second beam has dropped below the threshold value.

12. The method of claim 1, wherein one or more of the first beam and the second beam use a millimeter wave frequency band that includes frequencies that are greater than 24.25 GHz.

13. The method of claim 1, wherein the first wireless device is one of a user equipment (UE), a base station, a customer premises equipment (CPE), a relay device, a router, a repeater, or an integrated access and backhaul (IAB) node, and the second wireless device is one of a UE, a base station, a CPE, a relay device, a router, a repeater, or an IAB node.

14. A method for wireless communications at a second wireless device, comprising:
    establishing an uplink connection with a first wireless device using a first beam and a downlink connection with the first wireless device using a second beam that is different from the first beam;
    transmitting signaling to the first wireless device that indicates a first set of one or more radio link monitoring parameters for a first radio link monitoring process associated with the first beam and indicates a second set of one or more radio link monitoring parameters for a second radio link monitoring process associated with the second beam, wherein the first set of one or more radio link monitoring parameters for the first radio link monitoring process is different from the second set of one or more radio link monitoring parameters for the second radio link monitoring process;
    receiving a radio link failure indication from the first wireless device indicating that the second beam has a radio link failure, wherein the radio link failure indication comprises an indication of one or more candidate beams associated with a first beam characteristic that is a same as a second beam characteristic associated with the second beam; and initiating a beam recovery procedure with the first wireless device responsive to receiving the radio link failure indication.

15. The method of claim 14, wherein the first radio link monitoring process is independent of the second radio link monitoring process.

16. The method of claim 14, wherein the first set of one or more radio link monitoring parameters or the second set of one or more radio link monitoring parameters, or both include one or more threshold values for a reference signal received power associated with one or more of the first beam or the second beam, a quantity of occasions of reference signal received power being below the one or more threshold values, or any combinations thereof.

17. The method of claim 16, wherein one or more of the one or more threshold values and the quantity of occasions are different for the first beam and the second beam.

18. The method of claim 14, wherein the radio link failure indication for the second beam is received from the first wireless device via the uplink connection and indicates a downlink control channel failure.

19. The method of claim 14, wherein the radio link failure indication provides the one or more candidate beams for a beam training procedure.

20. The method of claim 19, wherein the initiating the beam recovery procedure comprises:
transmitting a beam training indication to the first wireless device that provides a resource and beam information for the beam training procedure; and
initiating the beam training procedure based at least in part on transmitting the beam training indication.

21. The method of claim 20, further comprising:
transmitting one or more training beams to the first wireless device; and
receiving a measurement report from the first wireless device that indicates one or more measurements associated with the one or more training beams.

22. The method of claim 14, wherein the receiving the radio link failure indication comprises:
receiving two or more indications of whether a reference signal received power associated with the second beam is above or below a threshold value; and
determining to initiate the beam recovery procedure based at least in part on the two or more indications indicating that the reference signal received power associated with the second beam has dropped below the threshold value.

23. The method of claim 14, wherein one or more of the first beam and the second beam use a millimeter wave frequency band that includes frequencies that are greater than 24.25 GHz.

24. The method of claim 14, wherein the first wireless device is one of a user equipment (UE), a base station, a customer premises equipment (CPE), a relay device, a router, a repeater, or an integrated access and backhaul (IAB) node, and the second wireless device is one of a UE, a base station, a CPE, a relay device, a router, a repeater, or an IAB node.

25. An apparatus for wireless communications at a first wireless device, comprising:
a processor; and
memory coupled with the processor, the processor configured to:
establish an uplink connection with a second wireless device using a first beam and a downlink connection with the second wireless device using a second beam that is different from the first beam;
initiate a first radio link monitoring process for the first beam on the uplink connection, wherein the first radio link monitoring process is associated with a first set of one or more radio link monitoring parameters;
initiate, based at least in part on the initiation of the first radio link monitoring process, a second radio link monitoring process for the second beam on the downlink connection, wherein the second radio link monitoring process is associated with a second set of one or more radio link monitoring parameters different from the first set of one or more radio link monitoring parameters;
select one or more candidate beams associated with a first beam characteristic that is a same as a second beam characteristic associated with the second beam; and
transmit, to the second wireless device based at least in part on a radio link failure, a radio link failure indication comprising an indication of the one or more candidate beams, wherein the radio link failure is based at least in part on the second radio link monitoring process.

26. The apparatus of claim 25, wherein the first radio link monitoring process is independent of the second radio link monitoring process.

27. The apparatus of claim 25, wherein the processor is further configured to:
measure an associated metric of the first beam or the second beam for one or more reference signals associated with the first beam or the second beam; and
determine that the associated metric for the one or more reference signals has dropped below a threshold value on at least a configured quantity of occasions.

28. An apparatus for wireless communications at a second wireless device, comprising:
a processor; and
memory coupled with the processor, the processor configured to:
establish an uplink connection with a first wireless device via a first beam and a downlink connection with the first wireless device via a second beam that is different from the first beam;
transmit one or more signals to the first wireless device indicating a first set of one or more radio link monitoring parameters for a first radio link monitoring process associated with the first beam and indicates a second set of one or more radio link monitoring parameters for a second radio link monitoring process associated with the second beam, wherein the first set of one or more radio link monitoring parameters for the first radio link monitoring process is different from the second set of one or more radio link monitoring parameters for the second radio link monitoring process;
receive a radio link failure indication from the first wireless device indicating that the second beam has a radio link failure, wherein the radio link failure indication comprises an indication of one or more candidate beams associated with a first beam characteristic that is a same as a second beam characteristic associated with the second beam; and
initiate a beam recovery procedure with the first wireless device responsive to receiving the radio link failure indication.

29. The apparatus of claim 28, further comprising an antenna array.

30. The apparatus of claim 28, wherein the first set of one or more radio link monitoring parameters or the second set of one or more radio link monitoring parameters, or both include one or more threshold values for a reference signal received power associated with one or more of the first beam or the second beam, a quantity of occasions of reference signal received power being below the one or more threshold values, or any combinations thereof.

31. A non-transitory computer-readable medium storing code for wireless communications performed by a first wireless device, the code comprising instructions executable by a processor to:
    establish an uplink connection with a second wireless device using a first beam and a downlink connection with the second wireless device using a second beam that is different from the first beam;
    initiate a first radio link monitoring process for the first beam on the uplink connection, wherein the first radio link monitoring process is associated with a first set of one or more radio link monitoring parameters;
    initiate, based at least in part on initiating the first radio link monitoring process, a second radio link monitoring process for the second beam on the downlink connection, wherein the second radio link monitoring process is associated with a second set of one or more radio link monitoring parameters different from the first set of one or more radio link monitoring parameters;
    select one or more candidate beams associated with a first beam characteristic that is a same as a second beam characteristic associated with the second beam; and
    transmit, to the second wireless device based at least in part on a radio link failure, a radio link failure indication comprising an indication of the one or more candidate beams, wherein the radio link failure is based at least in part on the second radio link monitoring process.

32. The non-transitory computer-readable medium of claim 31, wherein the first radio link monitoring process is independent of the second radio link monitoring process.

33. The non-transitory computer-readable medium of claim 31, wherein the instructions to one or more of the first radio link monitoring process and the second radio link monitoring process are executable by the processor to:
    measure an associated metric of the first beam or the second beam for one or more reference signals associated with the first beam or the second beam; and
    determine that the associated metric for the one or more reference signals has dropped below a threshold value on at least a configured quantity of occasions.

34. A non-transitory computer-readable medium storing code for wireless communications performed by a second wireless device, the code comprising instructions executable by a processor to:
    establish an uplink connection with a first wireless device using a first beam and a downlink connection with the first wireless device using a second beam that is different from the first beam;
    transmit signaling to the first wireless device that indicates a first set of one or more radio link monitoring parameters for a first radio link monitoring process associated with the first beam and indicates a second set of one or more radio link monitoring parameters for a second radio link monitoring process associated with the second beam, wherein the first set of one or more radio link monitoring parameters for the first radio link monitoring process is different from the second set of one or more radio link monitoring parameters for the second radio link monitoring process;
    receive a radio link failure indication from the first wireless device indicating that the second beam has a radio link failure, wherein the radio link failure indication comprises an indication of one or more candidate beams associated with a first beam characteristic that is a same as a second beam characteristic associated with the second beam; and
    initiate a beam recovery procedure with the first wireless device responsive to receiving the radio link failure indication.

35. The non-transitory computer-readable medium of claim 34, wherein the first radio link monitoring process is independent of the second radio link monitoring process.

36. The non-transitory computer-readable medium of claim 34, wherein the first set of one or more radio link monitoring parameters or the second set of one or more radio link monitoring parameters, or both includes one or more threshold values for a reference signal received power associated with one or more of the first beam or the second beam, a quantity of occasions of reference signal received power being below the one or more threshold values, or any combinations thereof.

37. A method for wireless communications at a first wireless device, comprising:
    establishing an uplink connection with a second wireless device using a first beam and a downlink connection with the second wireless device using a second beam that is different from the first beam;
    initiating a first radio link monitoring process for the first beam on the uplink connection and a second radio link monitoring process for the second beam on the downlink connection;
    determining a beam failure of one of the first beam or the second beam based on the first radio link monitoring process or the second radio link monitoring process;
    determining one or more candidate beams for the one of the first beam or the second beam for which beam failure is determined, wherein the one or more candidate beams are determined based on the other of the first beam or the second beam for which beam failure is not determined; and
    transmitting a beam failure indication to the second wireless device based on one of the first radio link monitoring process or the second radio link monitoring process, wherein the beam failure indication includes an indication of the one or more candidate beams for the one of the first beam or the second beam for which beam failure is determined.

38. The method of claim 37, wherein the first radio link monitoring process is independent of the second radio link monitoring process.

39. The method of claim 37, wherein one or more of the first radio link monitoring process or the second radio link monitoring process comprises:
    measuring an associated metric of the first beam or the second beam for one or more reference signals associated with the first beam or the second beam; and
    determining that the associated metric for the one or more reference signals has dropped below a threshold value on at least a configured number of occasions.

40. The method of claim 39, wherein the associated metric of the first beam or the second beam includes at least one of a reference signal received power (RSRP), a reference signal received quality (RSRQ), a signal-to-noise ratio (SNR), a signal-to-interference and noise ratio (SINR) a reference signal strength indicator (RSSI), or any combination thereof, for the one or more reference signals associated with the first beam or the second beam.

41. The method of claim 39, wherein one or more of the threshold value of the associated metric or the configured number of occasions, is different for the first beam and the second beam.

42. The method of claim 37, wherein the beam failure indication for the second beam is reported as a downlink control channel failure and is transmitted to the second wireless device using the first beam.

43. The method of claim 37, wherein the radio link failure indication provides the one or more candidate beams for a beam training procedure, the method further comprising:
receiving, from the second wireless device responsive to the beam failure indication, a beam training indication that indicates that one or more reference signals are to be transmitted using one or more particular beams for the beam training procedure, wherein the one or more particular beams include at least one of the one or more candidate beams; and
initiating the beam training procedure responsive to the beam training indication.

44. The method of claim 43, further comprising:
measuring one or more reference signals from one or more training beams received from the second wireless device; and
transmitting a measurement report to the second wireless device based at least in part on the measuring.

45. The method of claim 37, wherein the transmitting the beam failure indication comprises:
determining that a triggering event has occurred based on one or more counters associated with one or more beam quality thresholds; and
transmitting the beam failure indication responsive to an occurrence of the triggering event.

46. The method of claim 37, wherein the transmitting the beam failure indication comprises:
reporting an indication of whether a metric associated with the second beam has dropped below a threshold value for use in a beam recovery procedure based on one or more indications that the metric associated with the second beam has dropped below the threshold value.

47. The method of claim 37, wherein one or more of the first beam or the second beam use a millimeter wave frequency band that includes frequencies that are greater than 24.25 GHz.

48. The method of claim 37, wherein:
the first wireless device is a user equipment (UE) or a customer premises equipment (CPE) and the second wireless device is a base station, a relay device, a router, a repeater, or an integrated access and backhaul (IAB) node.

* * * * *